(12) United States Patent
Mahaney et al.

(10) Patent No.: US 8,301,526 B2
(45) Date of Patent: Oct. 30, 2012

(54) METHOD FOR MAXIMIZING RETIREMENT INCOME USING FINANCIAL BRIDGE PRODUCTS AND DEFERRED SOCIAL SECURITY INCOME

(75) Inventors: James I. Mahaney, Upper Montclair, NJ (US); Peter C. Carlson, Edison, NJ (US)

(73) Assignee: The Prudential Insurance Company of America, Newark, NJ (US)

( * ) Notice: Subject to any disclaimer, the term of this patent is extended or adjusted under 35 U.S.C. 154(b) by 1510 days.

(21) Appl. No.: 11/051,986

(22) Filed: Feb. 4, 2005

(65) Prior Publication Data
US 2005/0177509 A1    Aug. 11, 2005

Related U.S. Application Data

(63) Continuation-in-part of application No. 10/774,058, filed on Feb. 6, 2004.

(51) Int. Cl.
G06Q 40/00 (2012.01)
(52) U.S. Cl. ........................ 705/35; 705/36 R
(58) Field of Classification Search .............. 705/35, 705/36, 4
See application file for complete search history.

(56) References Cited

U.S. PATENT DOCUMENTS

| | | | |
|---|---|---|---|
| 4,750,121 A | 6/1988 | Halley et al. ............... 364/408 |
| 4,969,094 A | 11/1990 | Halley et al. ............... 364/408 |
| 5,291,398 A | 3/1994 | Hagan ....................... 364/408 |
| 5,774,881 A | 6/1998 | Friend et al. ................ 705/36 |
| 5,878,405 A | 3/1999 | Grant et al. ................. 705/39 |
| 5,893,071 A * | 4/1999 | Cooperstein ................ 705/4 |
| 5,918,217 A | 6/1999 | Maggioncalda et al. ........ 705/36 |
| 5,933,815 A * | 8/1999 | Golden ................... 705/36 R |
| 6,012,047 A | 1/2000 | Mazonas et al. .............. 705/38 |
| 6,021,397 A | 2/2000 | Jones et al. ................. 705/36 |
| 6,055,517 A | 4/2000 | Friend et al. ................ 705/36 |
| 6,078,904 A | 6/2000 | Rebane ...................... 705/36 |
| 6,085,174 A | 7/2000 | Edelman .................... 705/36 |
| 6,154,732 A | 11/2000 | Tarbox ...................... 705/36 |
| 6,219,650 B1 | 4/2001 | Friend et al. ................ 705/36 |
| 6,304,859 B1 | 10/2001 | Ryan et al. .................. 705/38 |
| 6,405,179 B1 | 6/2002 | Rebane ...................... 705/36 |
| 6,430,542 B1 | 8/2002 | Moran ....................... 705/36 |
| 2002/0019793 A1 | 2/2002 | Frattalone .................. 705/36 |
| 2002/0035527 A1 * | 3/2002 | Corrin ....................... 705/35 |
| 2002/0038271 A1 | 3/2002 | Friend et al. ................ 705/36 |
| 2002/0123953 A1 | 9/2002 | Goldfarb et al. ............. 705/36 |
| 2002/0161681 A1 | 10/2002 | Richman et al. ............. 705/36 |
| 2002/0188540 A1 | 12/2002 | Fay et al. ................... 705/36 |

(Continued)

OTHER PUBLICATIONS

Monks, "Labour to Make it Easier to Work After Retirement," Dec. 15, 2002, Sunday Times.*

(Continued)

*Primary Examiner* — Samica L Norman
(74) *Attorney, Agent, or Firm* — Baker Botts L.L.P.

(57) ABSTRACT

The present invention provides a method for maximizing retirement income using bridge annuities and deferred Social Security income. Financial information about a client is gathered, in addition to financial information about the client's spouse, if applicable. A variety of income scenarios are modeled using the financial information and a plurality of income models, each model including income from a bridge product and deferred Social Security income. Alternate funding approaches are projected using the financial information, and the modeled scenarios are compared to the alternate funding approaches to determine the optimal scenario for maximizing retirement income. The client can then purchase a bridge product in accordance with the optimal scenario.

10 Claims, 17 Drawing Sheets

U.S. PATENT DOCUMENTS

| | | | | |
|---|---|---|---|---|
| 2002/0194098 | A1 | 12/2002 | Stiff et al. | 705/36 |
| 2003/0023544 | A1 | 1/2003 | Chodes | 705/38 |
| 2003/0083972 | A1 | 5/2003 | Williams | 705/36 |
| 2004/0158517 | A1 | 8/2004 | Mahaney et al. | 705/36 |
| 2006/0218068 | A1* | 9/2006 | Loeper | 705/35 |

OTHER PUBLICATIONS

Report on Social Security Advisory Council Meeting, Apr. 21-22, 1996.*

Simon, "How to Be Sure You Never Go Broke," Oct. 1996, Money.*

"FYI for Your Information," vol. 27, Issue 60, Mellon Financial Corporation, prepared by Human Resources & Investor Solutions, Dec. 2, 2004.*

Mirer, "The Optimal Time to File for Social Security Benefits," Public Finance Review 26, pp. 611-636, May 28, 1998.*

Participating Annuity Bridge Fund, http://\www.elcabop.org/benefit_plans/pabf.asp (1 page).

Report on Social Security Advisory Council Meetings on Apr. 21 and Apr. 22, http://www.ssa.gov/history/reports/adcouncil/meeting/advisory_council_042295.html (5 pages).

Washington State Department of Retirement Systems, http://www.drs.wa.gov/agency/vendors/prior_rfps/00_30/00_30rfp.doc (76 pages).

The Winning Job Termination Strategy, http://tools.advisor.ca/advisor/edge/AOTY/index.epl?id=13549 (4 pages).

Retirement Planning Software, report conducted by LIMRA International, Inc. and the Society of Actuaries, 2003 (62 pages).

The Holiday Shopping Season 'tis Just Around the Conrner . . . article from http://www.businessweek.com (2 pages).

"FYI for Your Information," vol. 27, Issue 60, Mellon Financial Corporation, prepared by Human Resources & Investor Solutions , Dec. 2, 2004 (4 pages).

"Phase Retirement Contains Pros, Cons," articled from http://www.nytimes.com, Dec. 6, 2004 (2 pages).

"Phase Retirement—A New Alternative," Dechert on Point, Issue 30, Dec. 2004 (2 pages).

Thad W. Mirer, "The Optimal Time to File for Social Security Benefits," Public Finance Review 26, pp. 611-636, May 28, 1998 (39 pgs).

John Archer, "Retiring early? You'll need an 'income bridge' Annuity is simple but strip bonds offer flexibility," *National Post*, 5 pages, Mar. 8, 2000 (5 pgs).

Beverly J. Orth, "Retirement planning for married couples: Distribution differences," *Employee Benefit Plan Review*, vol. 57, Iss. 5, 7 pages, Nov. 2002 (7 pgs).

Richard Johnson, "The Puzzle of Later Male Retirement," *Economic Review, Federal Reserve Bank of Kansas City*, Issue Q III, pp. 5-26, 2002.

* cited by examiner

METHOD FOR MAXIMIZING RETIREMENT INCOME USING FINANCIAL BRIDGE PRODUCTS AND DEFERRED SOCIAL SECURITY INCOME

RELATED APPLICATIONS

This application is a continuation-in-part of U.S. patent application Ser. No. 10/774,058 filed Feb. 6, 2004, the entire disclosure of which is expressly incorporated herein by reference.

BACKGROUND OF THE INVENTION

1. Field of the Invention

The present invention relates to a method for maximizing retirement income using financial bridge products and deferred Social Security income.

2. Related Art

In recent years, employees have become increasingly responsible for providing retirement income. In large part, such responsibility is attributable to a shift by employers away from defined benefit pension plans to defined contribution plans, such as 401 (k) plans. Additionally, Social Security income is relied upon to supplement retirement income. However, income provided to a retired person by these sources may not be sufficient because of inflation, increases in cost of living expenses, spending of savings, longevity, investment performance, investment expenses, taxation, and other factors. Thus, there is a need to maximize retirement income over the course of one's retirement.

Regulations of the Social Security Administration provide that an individual can withdraw Social Security benefits at a pre-defined full retirement age. Prior to the full retirement age, reduced benefits can be taken as early as age 62. However, delayed retirement credits are awarded by the Social Security Administration if Social Security benefits are deferred past the full retirement age. Accordingly, there is an incentive for individuals to defer Social Security income as long as possible. However, if such income is deferred, the individual must be provided with an alternate source of retirement income (i.e., a bridge product) extending from the actual date of retirement to the deferred date of receipt of Social Security benefits.

There are numerous financial products used by individuals to save money and/or to provide income. For example, an annuity represents a financial product, often in the form of a contract between a prospective retiree and an insurance company, whereby payments are provided to the retiree at specified intervals after retirement. Annuities are tax-deferred, whereby annuity income is not taxed until withdrawal. A fixed annuity provides a constant payment amount over the life of the annuity, while a variable annuity does not. Other financial products include, but are not limited to, Funding Agreement Note Issuance Program (FANIP), settlement option under a deferred annuity, automatic withdrawals from deferred annuities or mutual funds, certificates of deposit, bonds, and fixed income.

While deferred Social Security benefits and annuities are known in the art, what presently is lacking is an efficient method for maximizing retirement income, wherein a variety of income scenarios of a potential retiree and his/her spouse are modeled, the client can select an optimal scenario, and the client is provided with at least one financial bridge product and defers Social Security benefits to maximize retirement income.

SUMMARY OF THE INVENTION

The present invention relates to a method for maximizing retirement income using deferred Social Security income and a financial bridge product, such as a bridge annuity, Funding Agreement Note Issuance Program (FANIP), settlement option under a deferred annuity, automatic withdrawals from deferred annuities or mutual funds, certificates of deposit, bonds, fixed income, or other suitable financial bridge product. Financial information about a client is gathered, in addition to financial information about the client's spouse, if applicable. Future income scenarios are modeled using a plurality of income models, each of the models including a bridge product and deferred Social Security income. The modeled scenarios can be adjusted according to the client's desires and/or needs. Income from the bridge product can be wrapped around Social Security payments to provide desired income levels during retirement. Alternate funding approaches including traditional 401 (k) plans and IRA accounts are projected using the financial information. The modeled scenarios are compared to the alternate funding approaches to determine the optimal-scenario for maximizing retirement income. The client can then purchase a bridge product in accordance with the optimal scenario.

According to the first income model of the present invention, a determination is made as to whether the client is a single individual or a married couple. If the client is single, the client is provided with a bridge product covering the time period spanning between the individual's date of retirement and date of receipt of delayed Social Security benefits. When the individual retires, income is provided from the bridge product and Social Security benefits are delayed until a delayed Social Security receipt date. At the delayed receipt date, income from the bridge product is exhausted and deferred Social Security benefits are taken until the client's death. If the client is a married couple, the couple is provided with a bridge product covering the time period spanning between the primary Social Security recipient's earliest retirement date and the date of receipt of delayed Social Security benefits. When the primary individual retires, income for the couple is provided from the bridge product and Social Security benefits are delayed until the delayed Social Security receipt date. At the delayed receipt date, income from the bridge product is exhausted and deferred Social Security benefits are taken. In addition to income from the bridge product, the individual's spouse receives his or her own Social Security benefits at the spouse's earliest retirement date. Additionally, the spouse receives spousal Social Security benefits if the spouse is entitled to such benefits and when the primary individual reaches the full retirement age defined by the Social Security Administration.

According to the second income model of the present invention, a married couple is provided with a bridge product covering the time period spanning between the primary individual's date of retirement and date of receipt of delayed Social Security benefits. When the primary individual retires, income for the couple is provided from the bridge product and Social Security benefits are delayed until a predetermined receipt date. At the delayed receipt date, income from the bridge product is exhausted and deferred Social Security benefits are taken. The individual's spouse receives his or her own Social Security benefits at an earliest retirement date, but does not receive spousal Social Security benefits until both the spouse and the primary individual reach the full retirement age.

According to the third income model of the present invention, a married couple is provided with a bridge product covering the time period spanning between the primary individual's date of retirement and date of receipt of delayed Social Security benefits. When the primary individual retires, income for the couple is provided from the bridge product and Social Security benefits are delayed until a pre-determined receipt date. At the pre-determined receipt date, income from the bridge product is exhausted and deferred Social Security benefits are taken. The individual's spouse receives his or her own Social Security benefits, in addition to spousal Social Security benefits, at the full retirement age.

According to the fourth income model of the present invention, a husband and a wife of a married couple are provided with respective bridge products covering the time period spanning between each individual's date of retirement and date of receipt of delayed Social Security benefits. When each individual retires, income for the couple is provided from the bridge products and Social Security benefits are delayed until a pre-determined receipt date. At the pre-determined receipt date, income from the bridge products is exhausted and deferred Social Security benefits are taken.

The present invention further provides a method for maximizing retirement income where an individual undertakes partial or "phased" retirement. The method comprises the steps of amending a pension plan to allow for early pension payments during a phased retirement period and remaining pension payments after the phased retirement period; funding a bridge product with the early pension payments; allowing an individual to work part-time during the phased retirement period; deferring Social Security income during the phased retirement period; supplementing part-time income for the individual during the phased retirement period with income from the bridge product; and after the phased retirement period, paying the individual the remaining pension payments and allowing the individual to receive deferred Social Security income. When phased retirement ends before delayed Social Security income is planned to start, the bridge annuity payments can be increased to make up for lost part-time income.

BRIEF DESCRIPTION OF THE DRAWINGS

Other important objects and features of the invention will be apparent from the following Detailed Description of the Invention taken in connection with the accompanying drawings in which:

FIGS. 3b-3c are graphs showing projected retirement incomes using the model shown in FIG. 3a.

FIG. 4b is a graph showing projected retirement income using the model shown in FIG. 4a.

FIGS. 5b-5c are graphs showing projected retirement income using the model shown in FIG. 5a.

FIGS. 6b-6c are graphs showing projected retirement income using the model shown in FIG. 6a.

DETAILED DESCRIPTION OF THE INVENTION

The present invention relates to a method for maximizing retirement income using bridge products and deferred Social Security income. By deferring Social Security income to a later date in retirement, e.g., to an age later than the full retirement age ("FRA") defined by the Social Security administration, or other age, Social Security income can be maximized. According to the method of the present invention, financial information about a client is gathered, in addition to financial information about the client's spouse, if applicable. A variety of income scenarios are modeled using the financial information and a plurality of income models, each model including a bridge product and deferred Social Security income. Alternate funding approaches are projected using the financial information, and the modeled scenarios are compared to the alternate funding approaches to determine the optimal scenario for maximizing retirement income. The client can then purchase one or more bridge products in accordance with the optimal scenario.

Figure 1:
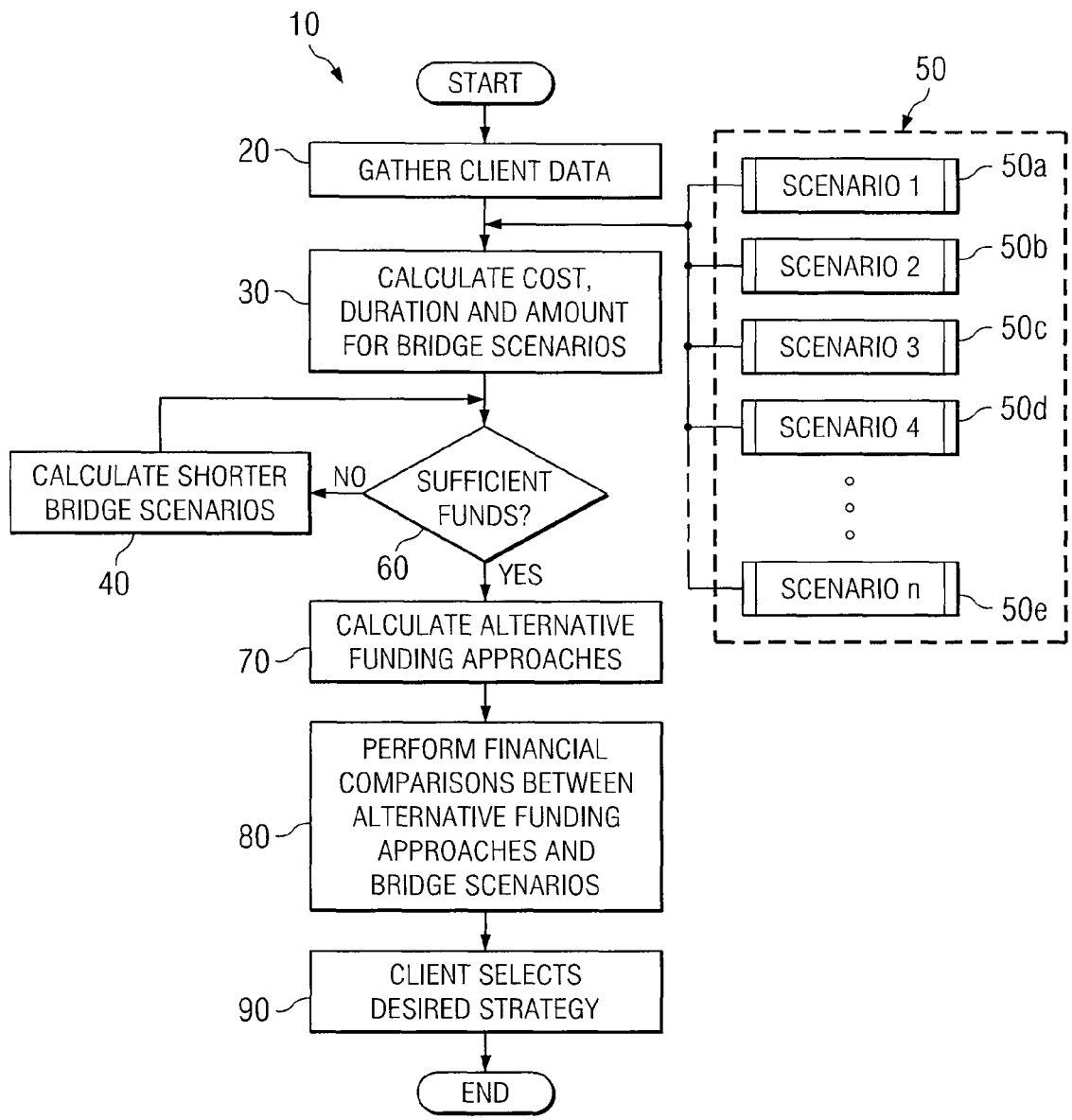
FIG. 1 is a flowchart showing the method of the present invention for maximizing retirement income.

FIG. 1 is a flowchart showing the method of the present invention, indicated generally at 10, for maximizing retirement income. The method 10 can be practiced by an insurance agent, actuary, accountant, financial planner, or any individual rendering financial services for a client, or even by the client. Further, the method 10 could be programmed as a financial planning application and executed by one or more computer systems. Beginning in step 20, information about the client is gathered. The client could be a single individual or a married couple. Information gathered in step 20 includes, but is not limited to, one or more of the following: name, date of birth, qualified retirement account balance, target yearly income, annual inflation rate assumption, annuity start date, modeling age, expected amount of taxable fixed income, expected amount of monthly taxable, inflation-protected income, expected amount of monthly non-taxable, fixed income, expected amount of monthly non-taxable, inflation-protected income, inflation-adjusted assumption used to calculate other income, amount of other temporary income, length of time expected to receive temporary income, growth percentage of other income, federal tax status, rate of return assumptions for invested retirement funds, expected expenses of retirement funds (including financial advisor and other applicable fees), accumulated monthly Social Security benefit in today's dollars (or future dollars), and exact age until which benefits can be collected. The information collected in step 20 can be gathered verbally, in writing (i.e., by filling out a questionnaire), or by one or more user interface screens on a computer system.

In step 30, one or more bridge product amounts, durations, and costs are calculated using the information collected in step 20, in one or more scenarios 50. By the term "bridge product" it is meant any financial product capable of providing periodic (e.g., monthly) income payments, such as an annuity, Funding Agreement Note Issuance Program (FA-NIP), settlement option under a deferred annuity, automatic withdrawals from deferred annuities or mutual funds, certificates of deposit, bonds, fixed income, retail notes (e.g., medium term notes) or other suitable product. The scenarios 50, which comprise individual scenarios 50a-50d and, optionally, additional scenarios 50e, are modeled in accordance with income models that are unique to the present invention. One or more of the scenarios 50 can be selected by the client for modeling and future income projection.

In step 60, a determination is made as to whether the client presently has sufficient funds to purchase at least one bridge product modeled in at least one of the scenarios 50. If a negative determination is made, step 40 occurs, wherein a shorter bridge product is calculated for the one or more scenarios 50, until the client can afford to purchase the bridge product. If a positive determination is made, step 70 is invoked, wherein alternate funding approaches are calculated. Examples of alternate funding approaches include, but are not limited to, Individual Retirement Accounts (IRAs), 401(k) plans, savings accounts, and traditional Social Security benefits. Then, in step 80, financial comparisons are performed between the alternate funding approaches and the one or more modeled scenarios 50. This allows the client to compare, numerically and/or graphically, the results of selecting one or more of the scenarios 50 versus one or more of the alternate funding approaches. In step 90, based upon the comparisons performed in step 80, the client selects a desired financial strategy. In most cases, the client will select one of the modeled scenarios 50, due to the financial benefits of purchasing a bridge product and deferring Social Security income. When one of the scenarios is selected in step 90, the client then purchases a bridge product, from an insurance agent, financial entity or other applicable entity, that has been modeled in one of the scenarios 50 and has the parameters (i.e., duration, total purchase amount, and payout amounts) calculated in step 30.

Figure 2:
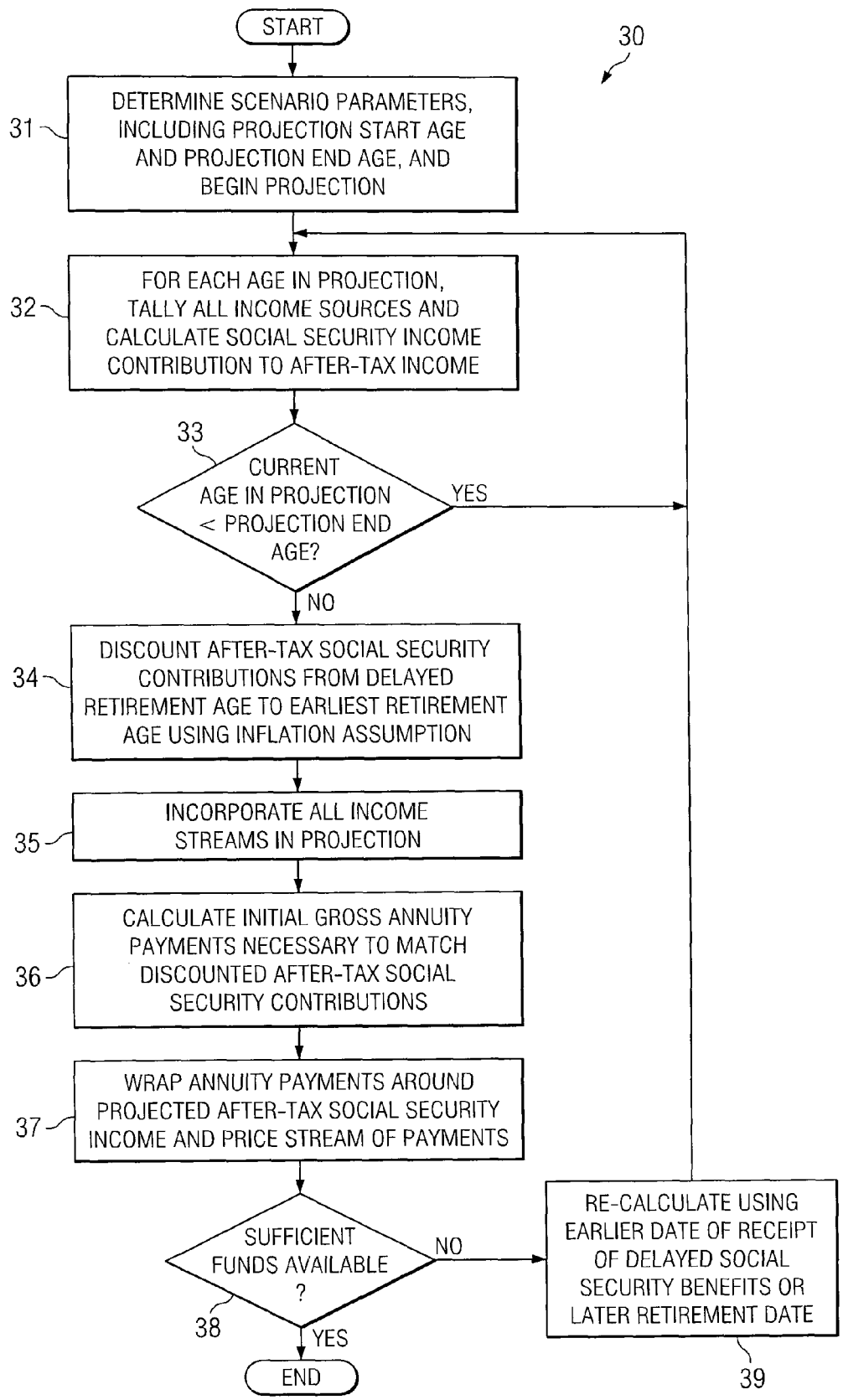
FIG. 2 is a flowchart showing bridge product length and cost calculation step of FIG. 1 in greater detail.

FIG. 2 is a flowchart showing the bridge product length and cost calculation step 30 of FIG. 1 in greater detail. The process 30 allows for the calculation and adjustment of costs, duration, and payout amounts for one or more of the bridge scenarios 50 shown in FIG. 1. Beginning in step 31, scenario parameters, including primary and spousal social security filing and suspension dates, bridge product payout dates, retirement ages, and delayed social security receipt dates, are determined. Additionally, a starting age and an ending age for payout projections are determined, and income payment projections begin. In step 32, for each age in the projection, all income sources, including, but not limited to, Social Security payments, other income sources, and bridge product payments, are tallied, and Social Security income contributions to after-tax income are calculated. Optionally, pre-tax income contributions could also be calculated in step 32. In step 33, a determination is made as to whether the current projection age is less than the ending projection age. If a positive determination is made, step 32 is repeated, and the next age in the projection is calculated. If a negative determination is made (i.e., the projection end age is reached), step 34 is invoked, wherein after-tax Social Security contributions are discounted from a delayed retirement age (e.g., age 70) to an earliest retirement age (e.g., age 62), using an inflation assumption. Further, pre-tax Social Security contributions could be discounted in step 34 from the delayed retirement age to the earliest retirement age, using an inflation assumption.

In step 35, all income streams are incorporated into the projection, including temporary income and any other applicable income source. Then, in step 36, initial gross annuity payments necessary to match the discounted after-tax social security contributions are calculated. Optionally, payments for any other bridge product in addition to an annuity could be calculated in step 36. Then, in step 37 bridge product (e.g., annuity) payments are wrapped around the projected after-tax Social Security income payments, and a stream of payments are priced. In step 38, a determination is made as to whether the client has sufficient funds to purchase the bridge product (e.g., annuity). If a positive determination is made, process 30 ends. Otherwise, step 39 is invoked, wherein the bridge scenario is re-calculated using an earlier date of receipt of delayed Social Security benefits (e.g., less than age 70), or a later retirement date (e.g., greater than age 62). Step 32 is then repeated, so that the bridge scenario can be re-calculated in accordance with process 30. The projections calculated in step 30 can start at any desired date, and can extend to any desired termination date, such as age 95.

As mentioned earlier, each of the scenarios 50 of FIG. 1 are modeled in accordance with income models that are unique to the present invention. Those models will now be described with reference to FIGS. 3a-6d. As used herein, the terms "model" and "scenario" are used interchangeably. Further, the models shown in FIGS. 3a-6d and described herein disclose the use of a bridge annuity and deferred Social Security income to maximize retirement income. However, it is to be expressly understood that any suitable financial bridge product, such as a Funding Agreement Note Issuance Program (FANIP), settlement option under a deferred annuity, automatic withdrawals from deferred annuities or mutual funds, certificates of deposit, bonds, fixed income, retail notes, or other suitable bridge product, can be utilized in place of a bridge annuity, or in conjunction therewith, without departing from the spirit or scope of the present invention. Additionally, each of the models described herein can model other income sources (e.g., source of income other than bridge product income and Social Security income, such as temporary retirement income from a part-time job, or other similar source), and bridge product and deferred Social Security payments can be calculated while taking into consideration such other income. Further, income can be provided from more than one bridge product, e.g., income could be provided from more than one bridge annuity. Importantly, each of the models disclosed herein allow for bridge payments to be custom-tailored to each client, whereby payments can be "wrapped" around existing income sources to provide a consistent, inflation-protected stream of income for a client.

Figure 3A:
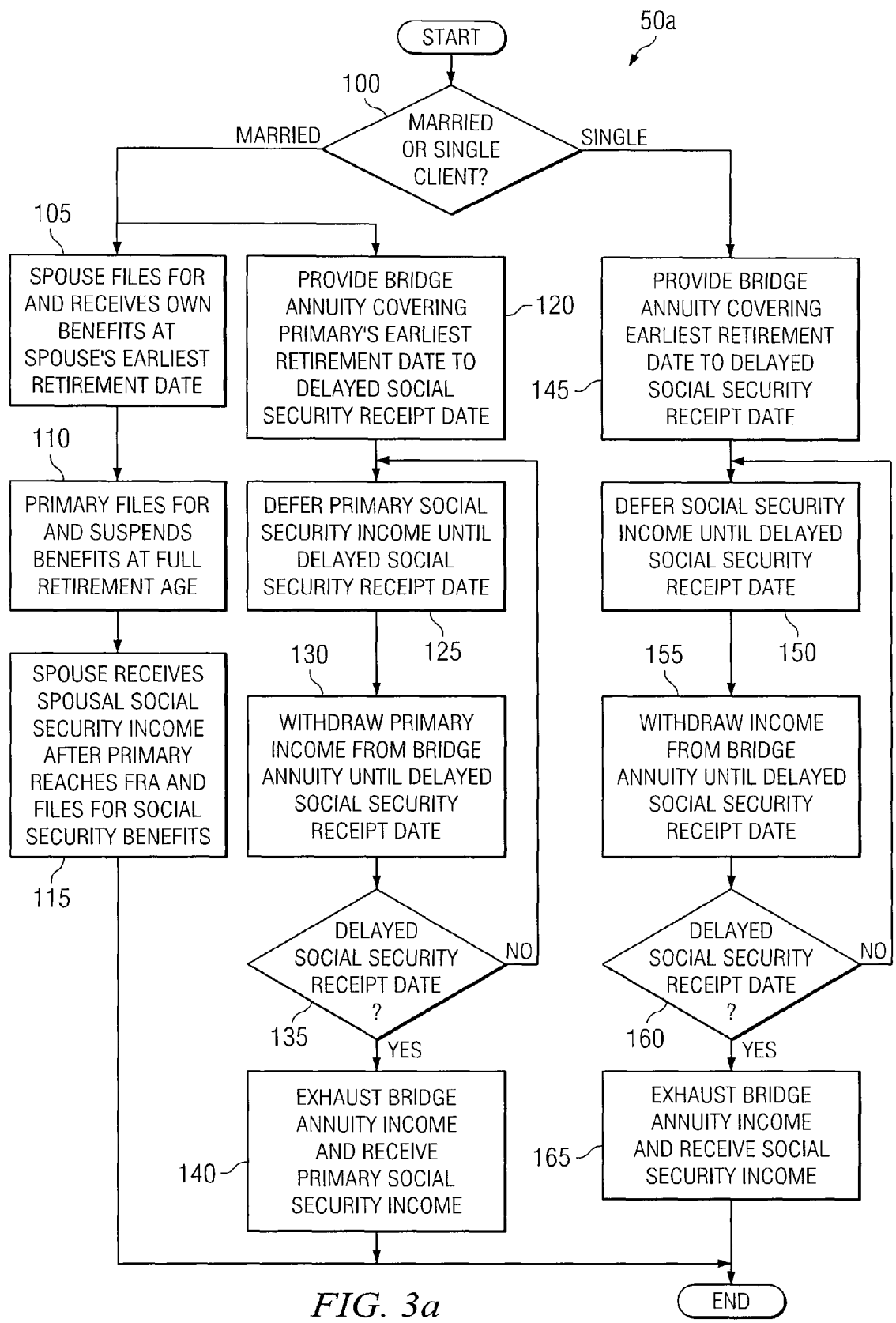
FIG. 3a is a flowchart showing the first income model according to the present invention.

FIG. 3a is a flowchart showing the first income model (or, scenario) according to the present invention, indicated generally at 50a. The model 50a projects future income for a single or married client. For a married client, the spouse takes all Social Security benefits as soon as possible. Beginning in step 100, a determination is made as to whether the client is single or married. If the client is married, step 105 occurs, wherein the spouse files for and receives his or her own Social Security benefits at the spouse's earliest retirement date at which Social Security benefits are available. Presently, the earliest entitlement age for Social Security benefits is age 62, but this age can fluctuate according to changes in regulations of the Social Security Administration. Further, the spouse's earliest retirement date could be later than the earliest entitlement date for Social Security benefits, e.g., age 63 or older. In step 110, the primary recipient files for and suspends receiving Social Security benefits at a Full Retirement Age ("FRA"). The FRA is set forth by the regulations of the Social Security Administration, and is anticipated to increase to age 67 in the future.

Depending upon the income level of the spouse, the spouse may also be entitled to a Social Security spousal benefit if the spouse's Social Security primary insurance amount is less than one half of the primary beneficiary's primary insurance amount. Such benefits, if available, can only be received after the primary beneficiary has filed for benefits. If this is the case, in step 115, the spouse receives spousal Social Security income after the primary recipient is eligible and files for benefits. The spouse can then receive spousal Social Security benefits as early as age 62, or at any later point.

In addition to steps 105-115, if the client is married, steps 120-140 are also carried out. In step 120, a bridge annuity is established covering the time period extending between the primary recipient's earliest date of retirement to a pre-determined date for receiving delayed Social Security income benefits. Preferably, the delayed Social Security receipt date is age 70, but other ages could be utilized and modeled. In step 125, the primary beneficiary's Social Security income is deferred until the primary beneficiary reaches the deferred Social Security receipt date. Then, in step 130, income is withdrawn from the bridge annuity until the deferred Social Security receipt date. In step 135, a determination is made as to whether the primary beneficiary has reached the age for receiving deferred Social Security benefits (e.g., age 70). If a negative determination is made, steps 125 and 130 are repeated, so that income is continued to be withdrawn from the bridge annuity and Social Security benefits are deferred. If a positive determination is made in step 135, i.e., the primary beneficiary has reached the age for receiving deferred Social Security benefits (e.g., age 70), then step 140 occurs. In step 140, income from the bridge annuity is exhausted, and the primary beneficiary begins receiving deferred Social Security income.

In the event that a determination is made in step 100 that the client is single, step 145 is invoked. In step 145, a bridge annuity is established covering the time period extending between the earliest retirement date of the client to a pre-determined date for receiving delayed Social Security income benefits. Preferably, the delayed Social Security receipt date is age 70, but other ages could be utilized and modeled. In step 150, the client's Social Security income is deferred until the client reaches the deferred Social Security receipt date. Then, in step 155, income is withdrawn from the bridge annuity until the deferred Social Security receipt date. In step 160, a determination is made as to whether the client has reached the age for receiving deferred Social Security benefits (e.g., age 70). If a negative determination is made, steps 150 and 155 are repeated, so that income is continued to be withdrawn from the bridge annuity and Social Security benefits are deferred. If a positive determination is made in step 160, i.e., the client has reached the age for receiving deferred Social Security benefits (e.g., age 70), then step 165 occurs. In step 165, income from the bridge annuity is exhausted, and the primary beneficiary begins receiving deferred Social Security income.

Figure 3B:
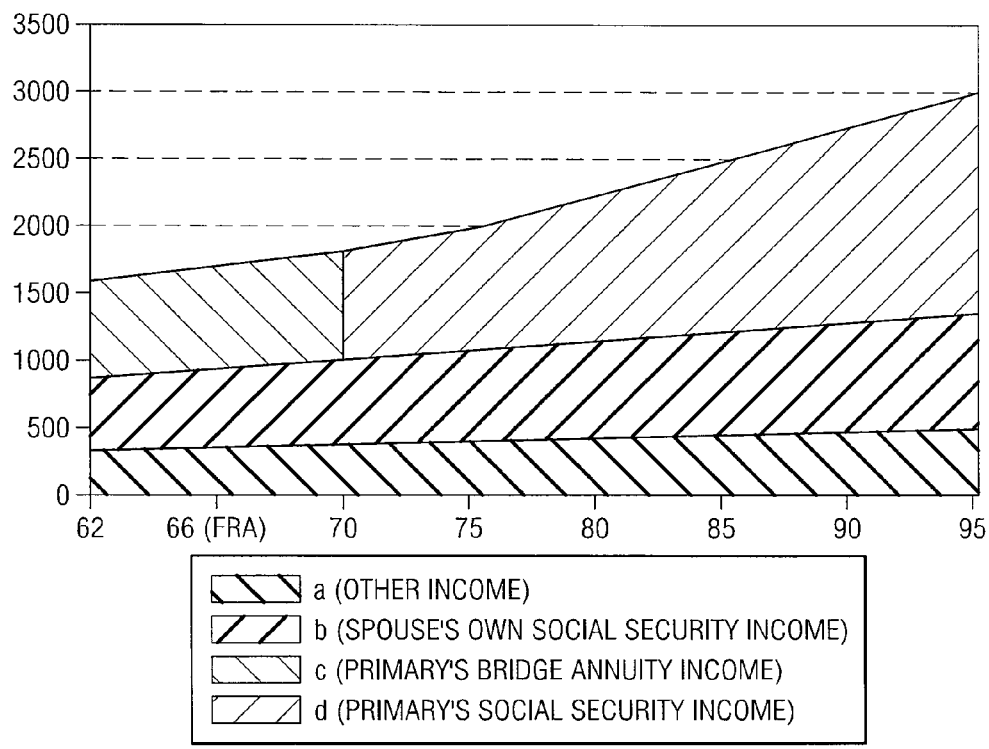

FIG. 3b is a graph showing projected retirement income using the model shown in FIG. 3a. This graph shows projected income streams for a married couple, wherein the spouse's own Social Security benefits are taken as early as possible and the Social Security spousal benefit is unavailable (i.e., the spouse's own Social Security income is greater than one half of the income of the primary recipient). Other income sources are shown in area A of the graph. Area B represents the spouse's own Social Security income. Income from the bridge annuity is shown in area C, and for purposes of illustration only, occurs from ages 62 to 70. Of course, the bridge annuity could provide income at ages earlier than age 62, e.g., at ages 61 or earlier. Moreover, Social Security income could be deferred by the primary beneficiary until an age earlier than age 70, and income from the bridge annuity could extend to such age. The primary beneficiary's Social Security income is shown in area D of the graph, beginning at age 70.

Figure 3C:
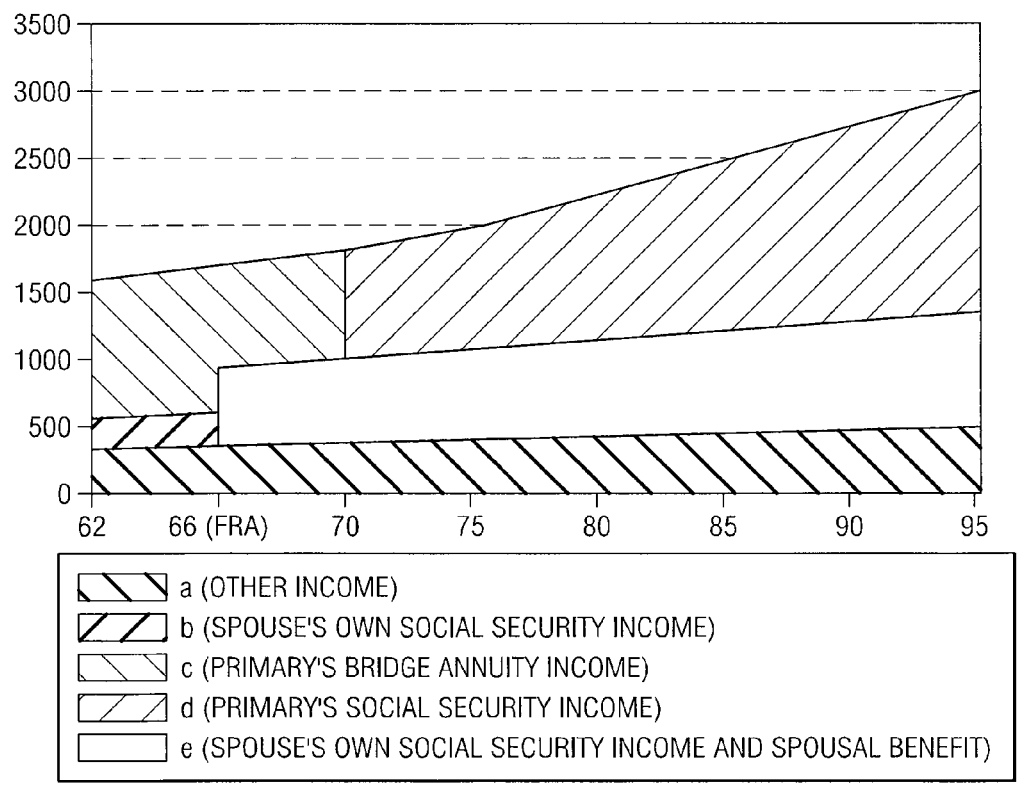

FIG. 3c is a graph showing projected retirement income using the model shown in FIG. 3a. This graph shows projected income streams for a married couple, wherein the spouse's own Social Security benefits are taken as early as possible and the Social Security spousal benefit is available (i.e., the spouse's own Social Security income is less than one half of the income of the primary recipient). In this case, the spousal benefit becomes available when the primary beneficiary reaches the FRA and files for his or her benefits, which is indicated in the graph as age 66. As mentioned earlier, this age could fluctuate in accordance with changes in the regulations of the Social Security Administration. Other income sources are shown in area A of the graph. Area B represents the spouse's own Social Security income, which is taken as early as possible (e.g., age 62). Area E represents both the spouse own Social Security income, in addition to spousal Social Security benefits, beginning at the FRA (e.g., age 66). Income from the bridge annuity is shown in area C. As can be readily appreciated, income provided by the annuity "wraps" around existing income sources, so that the client is provided with a consistent level of income during retirement. The primary beneficiary's Social Security income is shown in area D, beginning at age 70.

Figure 4A:
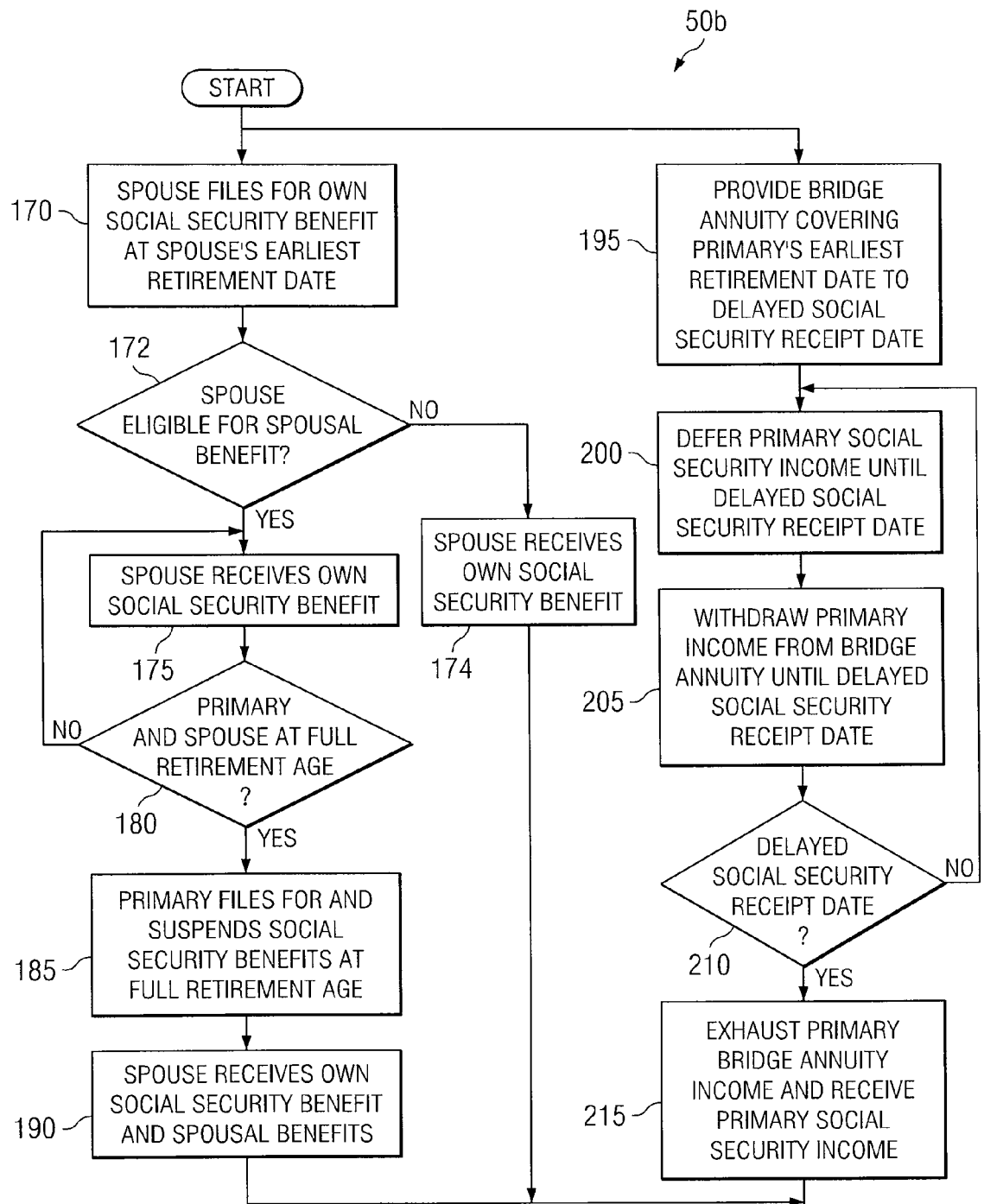
FIG. 4a is a flowchart showing a second income model according to the present invention.

FIG. 4a is a flowchart showing a second income model according to the present invention, indicated generally at 50b. The model 50b projects future income for a married couple wherein the spouse takes his or her own Social Security benefits as soon as eligible, but delays spousal Social Security benefits until both the spouse and the primary recipient reach the full retirement age. Beginning in step 170, the spouse files for his or her own Social Security benefits at the spouse's earliest retirement date (e.g., age 62) when Social Security benefits become available. In step 172, a determination is made as to whether the spouse is eligible to receive a spousal benefit. If a negative determination is made, step 174 occurs, wherein the spouse receives his or her own benefit. If a positive determination is made, step 175 occurs, wherein the spouse continues to receive his or her own benefits, and then step 180 occurs. In step 180, a determination is made as to whether both the primary beneficiary and the spouse are at the FRA (e.g., age 66). If a negative determination is made, step 175 is repeated, and the spouse continues to receive his or her own benefits. If a positive determination is made, step 185 occurs, wherein the primary beneficiary files for and suspends Social Security benefits if the primary beneficiary has not reached a pre-determined delayed Social Security receipt age (e.g., age 70). When the primary beneficiary reaches the pre-determined delayed receipt age, the primary beneficiary files for and receives his or her own Social Security benefits. Then, in step 190, the spouse receives his or her own Social Security benefits, in addition to spousal Social Security benefits.

Concurrent with step 170, step 195 also occurs. In step 195, a bridge annuity is established covering the time period extending between the earliest date of retirement of the primary beneficiary (e.g., age 62) to a pre-determined date for receiving delayed Social Security income benefits. Preferably, the delayed Social Security receipt date is age 70, but other ages could be utilized and modeled. In step 200, the primary beneficiary's Social Security income is deferred until the primary beneficiary reaches the deferred Social Security receipt date. Then, in step 205, income is withdrawn from the bridge annuity until the deferred Social Security receipt date. In step 210, a determination is made as to whether the primary beneficiary has reached the age for receiving deferred Social Security benefits (e.g., age 70). If a negative determination is made, steps 200 and 205 are repeated, so that income is continued to be withdrawn from the bridge annuity and Social Security benefits are deferred. If a positive determination is made in step 210, i.e., the primary beneficiary has reached the age for receiving deferred Social Security benefits (e.g., age 70), then step 215 occurs. In step 215, income from the bridge annuity is exhausted, and the primary beneficiary begins receiving deferred Social Security income.

Figure 4B:
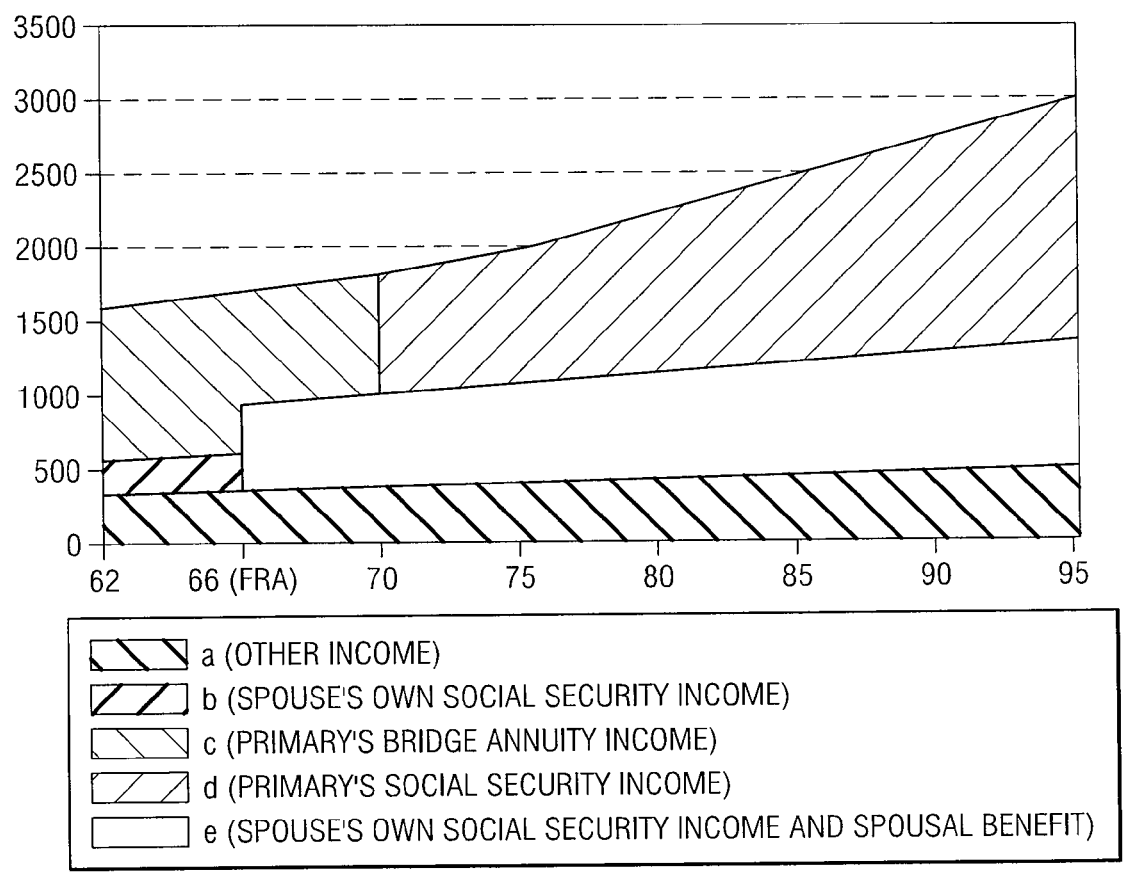

FIG. 4b is a graph showing projected retirement income using the model shown in FIG. 3a. This graph shows projected income streams for a married couple, wherein a spouse's own Social Security benefits are taken as early as possible and both the spousal Social Security benefit and the primary beneficiary's Social Security income are deferred. Other income sources are shown in area A of the graph. Area B represents the spouse's own Social Security income. At the FRA, spousal Social Security Benefits are also included as income, as shown in area E. Income from the bridge annuity is shown in area C, and occurs from ages 62 to 70. Of course, other durations are possible. The primary beneficiary's Social Security income is shown in area D, beginning at age 70.

Figure 5A:
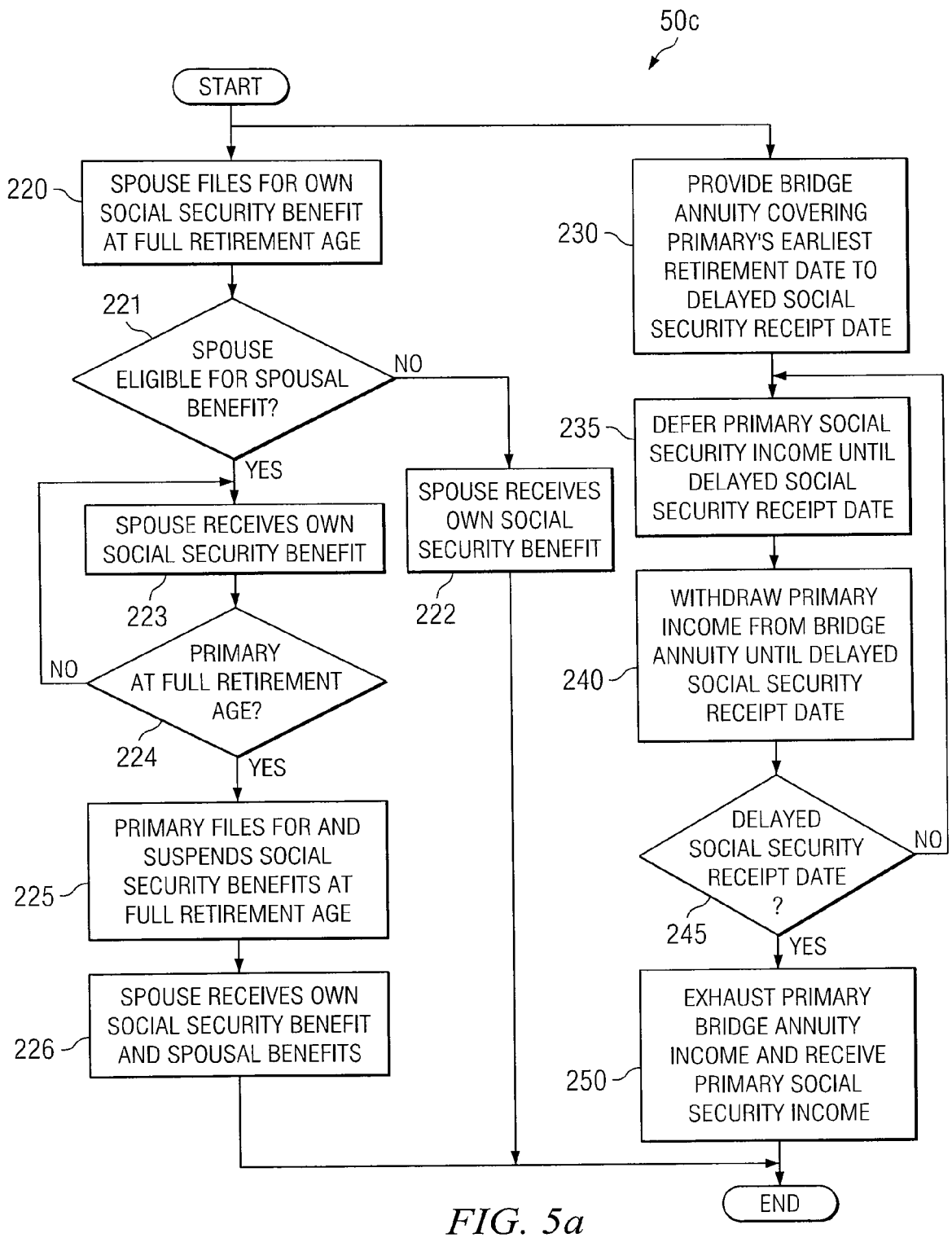
FIG. 5a is a flowchart showing a third income model according to the present invention.

FIG. 5a is a flowchart showing a third income model according to the present invention, indicated generally at 50c. The model 50c projects future income for a married couple wherein the spouse defers his or her own Social Security benefits and spousal Social Security benefits until the spouse reaches the FRA (e.g., age 66). Beginning in step 220, the spouse files for his or her own Social Security benefits when the spouse reaches the FRA (e.g., age 66). In step 221, a determination is made as to whether the spouse is eligible to receive a spousal benefit. If a negative determination is made, step 222 occurs, wherein the spouse receives his or her own Social Security benefit. If a positive determination is made, step 223 occurs, wherein the spouse receives his or her own Social Security benefit. Then, in step 224, a determination is made as to whether the primary beneficiary has reached the FRA. If a negative determination is made, step 223 is repeated, and the spouse continues to receive his or her own Social Security income. If a positive determination is made, step 225 occurs, wherein the primary recipient files for and suspends Social Security benefits at the FRA. Then, in step 226, the spouse receives both his or her own Social Security income and spousal Social Security income.

Concurrent with step 220, step 230 also occurs. In step 230, a bridge annuity is established covering the time period extending between the earliest date of retirement of the primary beneficiary (e.g., age 62) to a predetermined date for receiving delayed Social Security income benefits. Preferably, the delayed Social Security receipt date is age 70, but other ages could be utilized and modeled. In step 235, the primary beneficiary's Social Security income is deferred until the primary beneficiary reaches the deferred Social Security receipt date. Then, in step 240, income is withdrawn from the bridge annuity until the deferred Social Security receipt date. In step 245, a determination is made as to whether the primary beneficiary has reached the age for receiving deferred Social Security benefits (e.g., age 70). If a negative determination is made, steps 235 and 240 are repeated, so that income is continued to be withdrawn from the bridge annuity and Social Security benefits are deferred. If a positive determination is made in step 245, i.e., the primary beneficiary has reached the age for receiving deferred Social Security benefits (e.g., age 70), then step 250 occurs. In step 250, income from the bridge annuity is exhausted, and the primary beneficiary begins receiving deferred Social Security income.

Figure 5B:
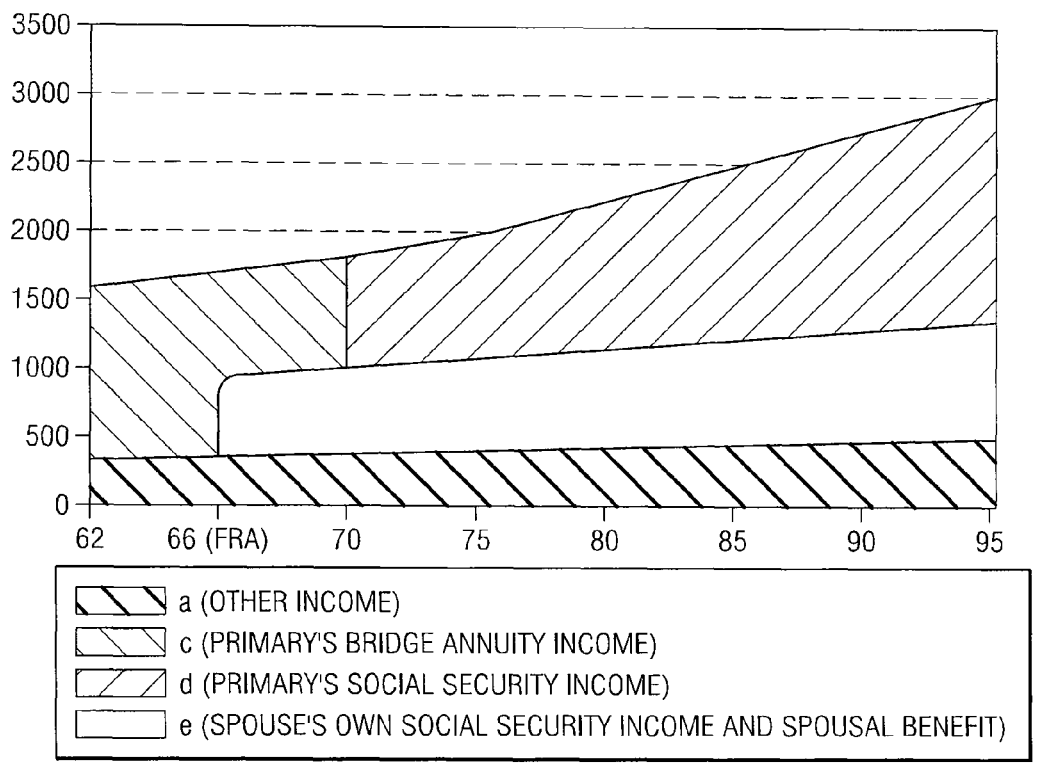

FIG. 5b is a graph showing projected retirement income using the model shown in FIG. 5a. This graph shows projected income streams for a married couple, wherein a spouse's own Social Security benefits and spousal Social Security benefits are deferred to the FRA (e.g., age 66). Other income sources are shown in area A of the graph. Area E represents the spouse's own Social Security income, taken at age 66. Income from the bridge annuity is shown in area C, and occurs from ages 62 to 70. The income provided by the bridge annuity and shown in area C "wraps around" the income provided in area E, thus providing the client with a consistent level of income in retirement while allowing Social Security benefits to be deferred so as to maximize retirement income. The primary beneficiary's Social Security income is shown in area D of the graph, beginning at age 70.

Figure 5C:
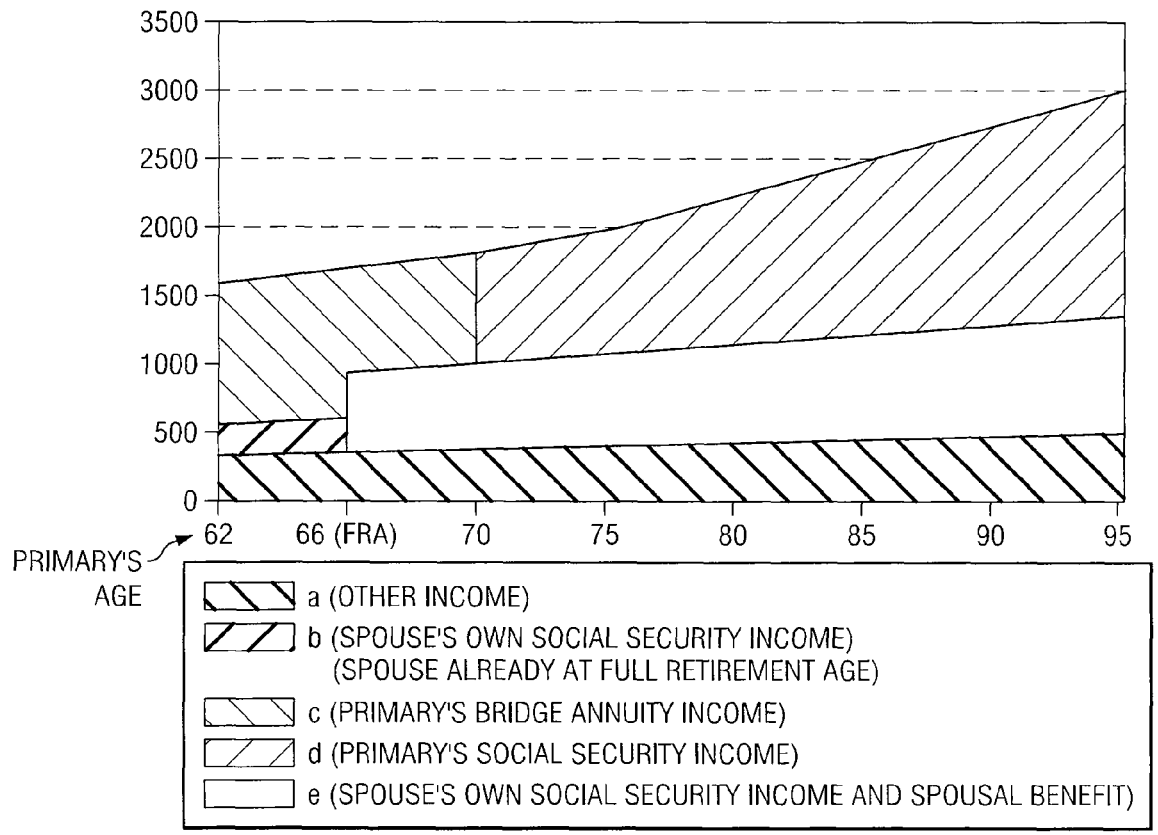

FIG. 5c is a graph showing projected retirement income using the model shown in FIG. 5a. This graph shows projected income streams for a married couple when the spouse is older than the primary beneficiary, and wherein a spouse's own Social Security benefits and spousal Social Security benefits are deferred to the FRA (e.g., age 66). Importantly, each of the models of the present invention can be applied where spouse are of different ages, and incomes projected taking into account such differences. As shown in FIG. 5c, the spouse does not collect a spousal Social Security benefit until the primary beneficiary has reached the FRA, and collects his or her own Social Security benefit when the spouse has reached the FRA. Other income sources are shown in area A of the graph. Area B sources represents the spouse's own Social Security income, taken when the spouse reaches the FRA (e.g., age 66). Area E represents both the spouses' own Social Security income and spousal Social Security benefits which are taken when the primary beneficiary has reached FRA. Income from the bridge annuity is shown in area C, and occurs from ages 62 to 70. The primary beneficiary's Social Security income is shown in area D of the graph, beginning at age 70.

Figure 6A:
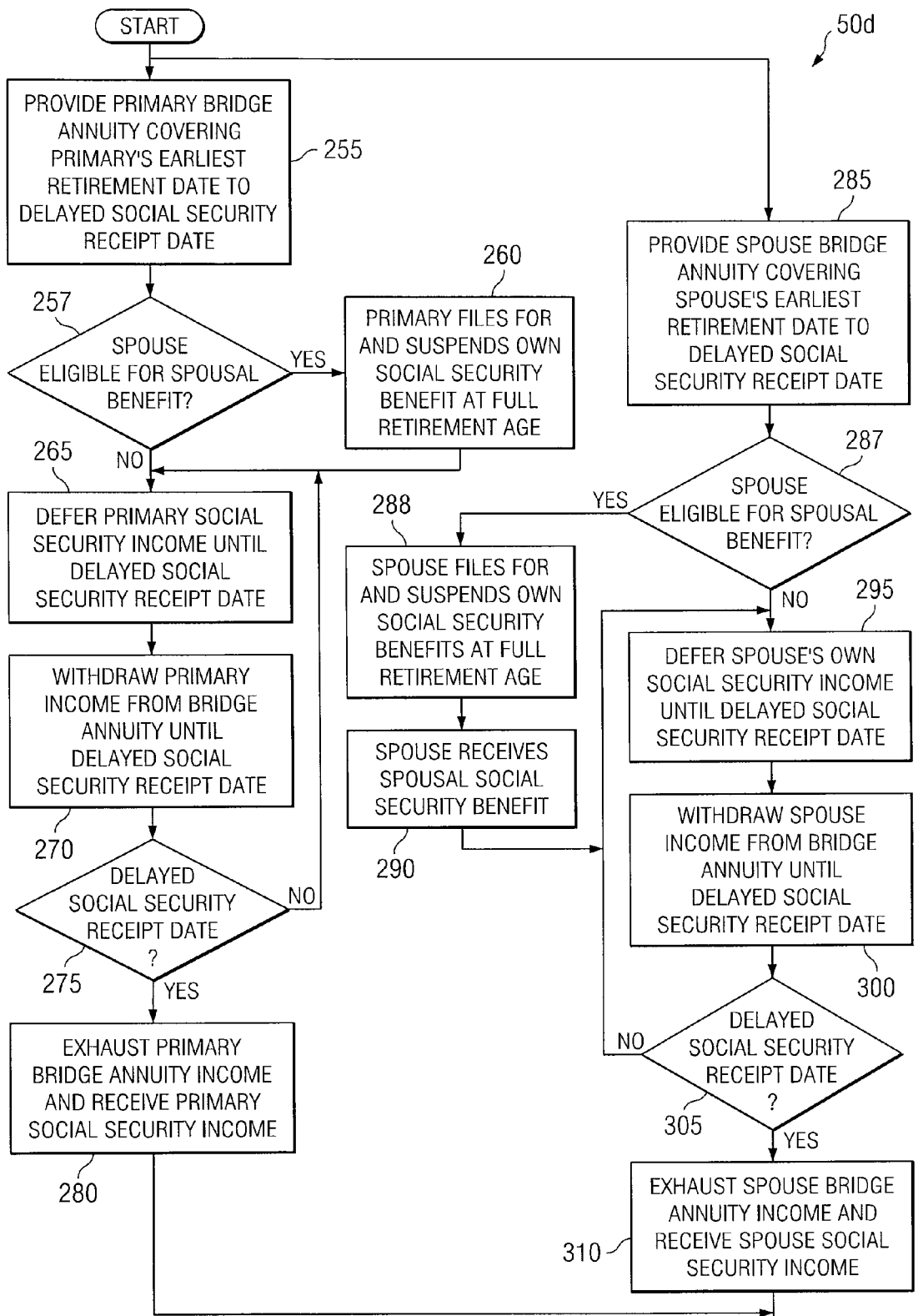
FIG. 6a is a flowchart showing a fourth income model according to the present invention.

FIG. 6a is a flowchart showing a fourth income model according to the present invention, indicated generally at 50d. The model 50d projects future income for a married couple, wherein both spouses defer Social Security benefits until a pre-determined receipt age (e.g., age 70), and bridge annuities are provided for both spouses. Beginning in step 255, a bridge annuity is established covering the time period extending between the earliest date of retirement of the primary beneficiary to a pre-determined date for receiving delayed Social Security income benefits. Preferably, the delayed Social Security receipt date is age 70, but other ages could be utilized and modeled. In step 257, a determination is made whether the spouse is eligible to collect spousal benefits on the primary beneficiary's record (i.e., the spouse's own Social Security income is less than one half of the primary beneficiary's Social Security income). If a positive determination is made, step 260 occurs, wherein the primary beneficiary files for and suspends his or her own Social Security benefits at the FRA (e.g., age 66). If a negative determination is made, step 265 occurs, wherein the primary beneficiary's Social Security income is deferred until the primary beneficiary reaches the deferred Social Security receipt date. Then, in step 270, income is withdrawn from the bridge annuity until the deferred Social Security receipt date. In step 275, a determination is made as to whether the primary beneficiary has reached the age for receiving deferred Social Security benefits (e.g., age 70). If a negative determination is made, steps 265 and 270 are repeated, so that income is continued to be withdrawn from the bridge annuity and Social Security benefits are deferred. If a positive determination is made in step 275, i.e., the primary beneficiary has reached the age for receiving deferred Social Security benefits (e.g., age 70), then step 280 occurs. In step 280, income from the bridge annuity is exhausted, and the primary beneficiary begins receiving deferred Social Security income.

Concurrent with step 255, step 285 also occurs. In step 285, a bridge annuity is established covering the time period extending between the earliest date of retirement of the spouse to a pre-determined date for receiving delayed Social Security income benefits. Preferably, the delayed Social Security receipt date is age 70, but other ages could be utilized and modeled. In step 287, a determination is made whether the spouse is eligible to collect spousal Social Security benefits on the primary beneficiary's record. If a positive determination is made, then step 288 occurs, wherein the spouse files for and suspends his or her own Social Security benefits at the FRA (e.g., age 66). Then, in step 290, the spouse receives the spousal Social Security benefit off of the primary beneficiary's record. In the event that a negative determination is made in step 287, or after step 290 occurs, then step 295 occurs. In step 295, the spouse's own Social Security income is deferred until the spouse reaches the deferred Social Security receipt date. Then, in step 300, income is withdrawn from the bridge annuity until the deferred Social Security receipt date. In step 305, a determination is made as to whether the spouse has reached the age for receiving deferred Social Security benefits (e.g., age 70). If a negative determination is made, steps 295 and 300 are repeated, so that income is continued to be withdrawn from the bridge annuity and Social Security benefits are deferred. If a positive determination is made in step 305, i.e., the spouse has reached the age for receiving deferred Social Security benefits (e.g., age 70), then step 310 occurs. In step 310, income from the bridge annuity is exhausted, and the spouse begins receiving deferred Social Security income.

Figure 6B:
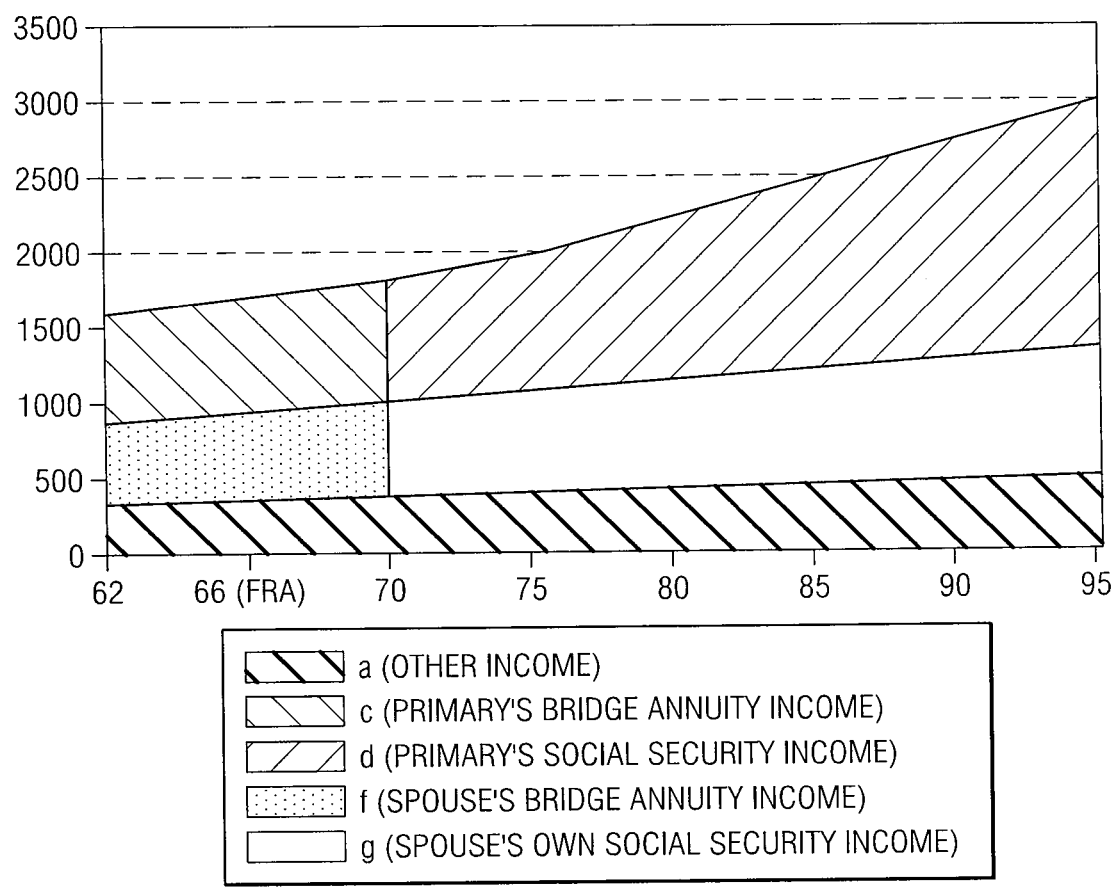

FIG. 6b is a graph showing projected retirement income using the model shown in FIG. 6a, wherein the spouse is not eligible to receive spousal benefits under the primary beneficiary's record. This graph shows projected income streams for a married couple, wherein Social Security income for both the spouse and the primary beneficiary is deferred, and two bridge annuities are provided. Other income sources are shown in area A of the graph. Income from the spouse's bridge annuity is shown in area F, and occurs from age 62 to age 70. The spouse's own Social Security income is shown in area G, beginning at age 70. Income from the primary beneficiary's bridge annuity is shown in area C, and the primary beneficiary's Social Security income is shown in area D, beginning at age 70. Importantly, the bridge annuities provided in accordance with model 50d could have varying durations and starting and ending dates, and further, could be staggered to accommodate couples of different ages.

Figure 6C:
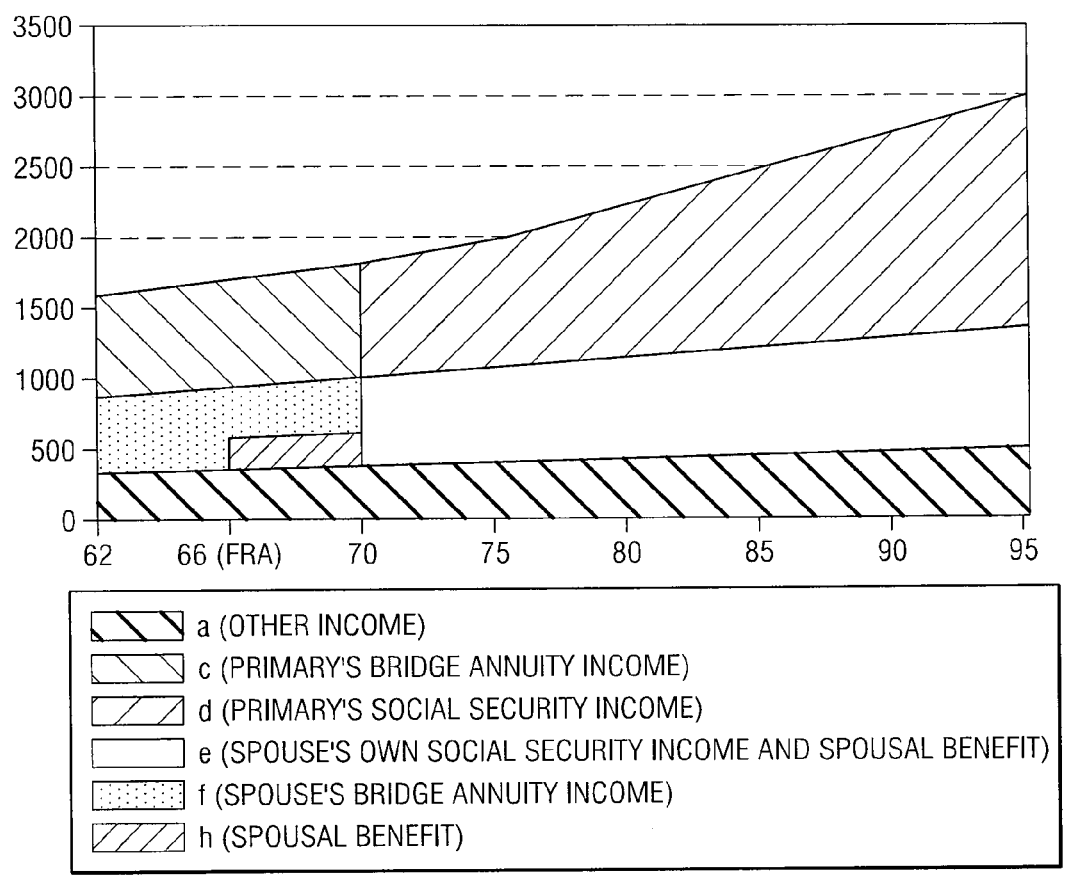

FIG. 6c is a graph showing projected retirement income using the method shown in FIG. 6a, wherein the spouse is eligible for spousal benefits under the primary beneficiary's record. This graph shows projected income streams for a married couple, wherein Social Security income for both the spouse and the primary beneficiary is deferred, and two bridge annuities are provided. Other income sources are shown in area A of the graph. Area H represents spousal Social Security benefits taken off of the primary beneficiary's record, beginning at the FRA. Income from the spouse's bridge annuity is shown in area F, and occurs from age 62 to age 70. Area E represents both the spouse's own Social Security income (deferred until and taken at age 70), as well as spousal Social Security benefits. Income from the primary beneficiary's bridge annuity is shown in area C, and the primary beneficiary's Social Security income is shown in area D, beginning at age 70.

Output from the models can be presented to the client in a form similar to the graphs shown herein, or in any other desired fashion, such as numerically via a series of tables. Outputs from the models can be then compared to alternate income sources so that the client can select the optimum scenario and purchase one or more bridge products in accordance with the optimal scenario.

Figure 7:
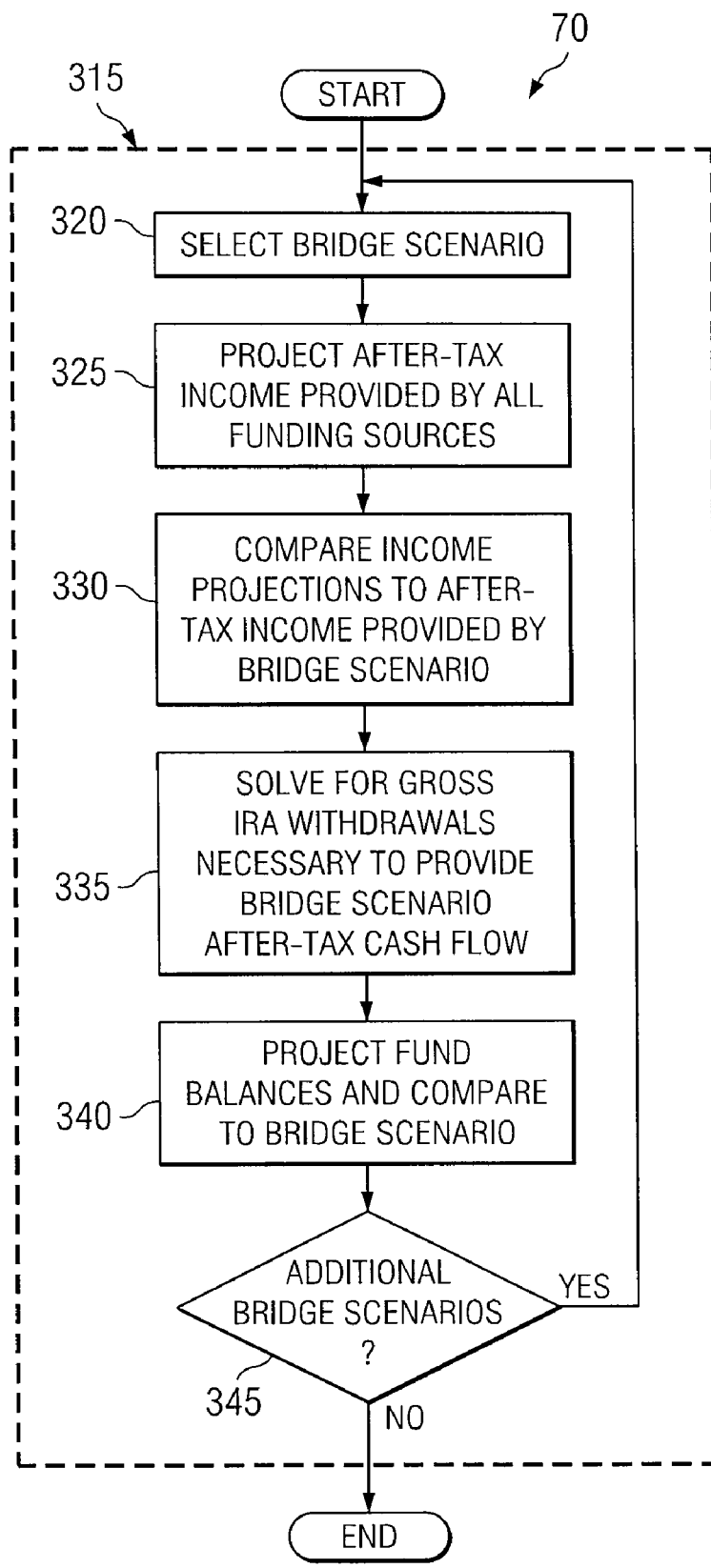
FIGS. 7 and 8 are flowcharts showing the alternate funding calculation step of FIG. 1 in greater detail.
Figure 8:
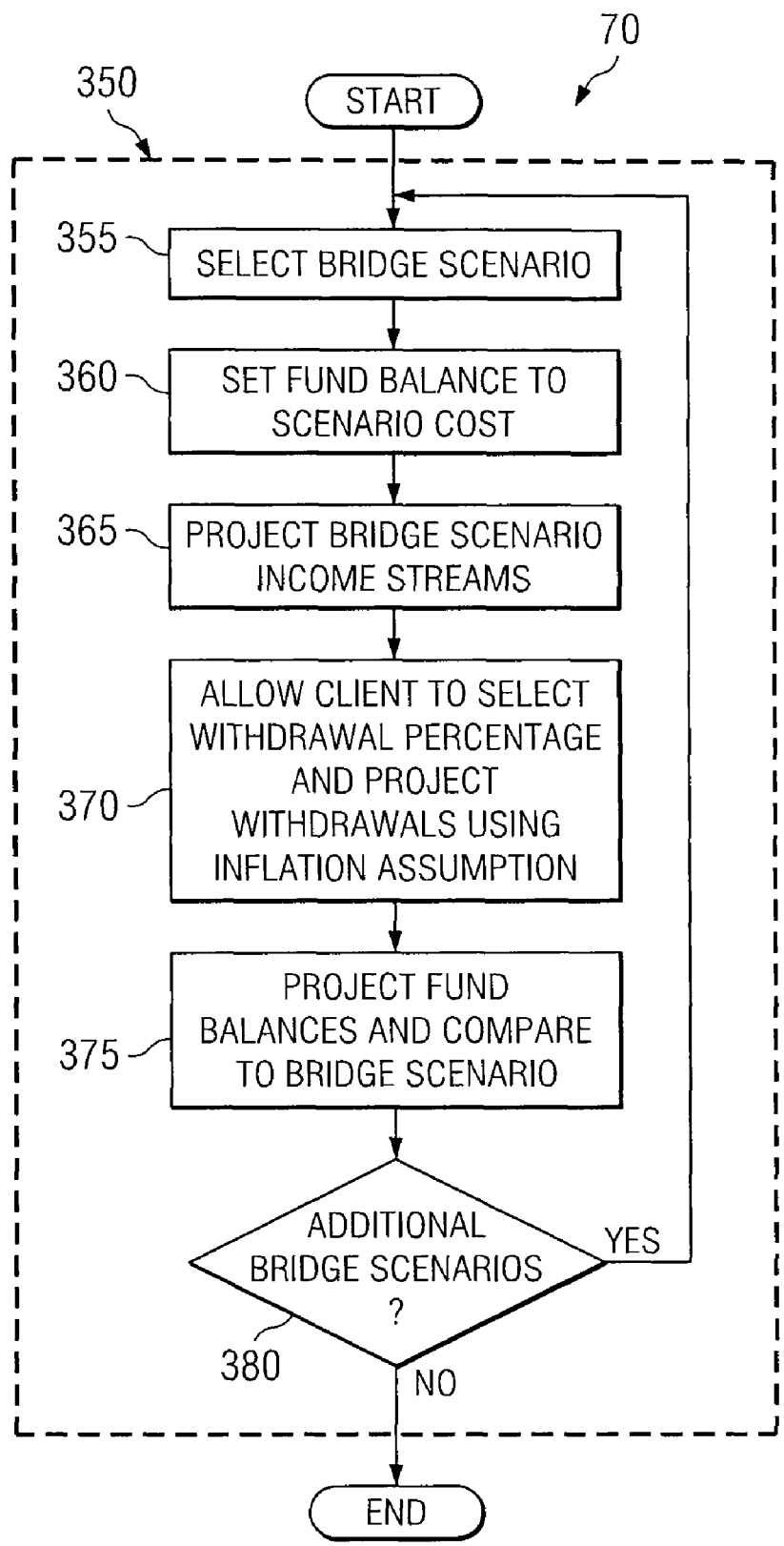

FIGS. 7 and 8 are flowchart showing the alternate funding calculation step 70 of FIG. 1 in greater detail. As mentioned earlier, alternate funding sources, such as the traditional method of taking Social Security benefits prior to full retirement age, and fund addition income (such as IRA withdrawals), can be calculated by the present invention and serve as a basis of comparison with one or more of the scenarios generated by the present invention. As shown in FIG. 7, process 315 allows for calculations of traditional IRA withdrawals, and projects withdrawals required to mach a given scenario.

Beginning in step 320, a bridge scenario is selected. Then, in step 325, after-tax income is projected across all funding sources, including any existing IRA that the client may have. Then, in step 330, the after-tax projections are compared to income provided by the bridge scenario. In step 335, gross IRA withdrawals that are necessary to match the bridge scenario after-tax cash flow are calculated. In step 340, fund balances are projected and compared to the bridge scenario. In step 345, a determination is made as to whether additional bridge scenarios should be modeled. If so, step 320 is repeated so that alternate funding sources can be projected for such bridge scenarios. Alternatively, the initial fund balance for the funding source can be set equal to the annuity cost for comparison purposes. Output of process 315 can be analyzed in a Monte Carlo simulation, or other suitable statistical analysis could be applied.

FIG. 8 shows a process, indicated generally at 350, for calculating fund withdrawals at a fixed percentage for comparison with one or more bridge scenarios. Beginning in step 355, a bridge scenario is selected. Then, in step 360, a fund balance is set to match the cost of the scenario. In step 365, income streams from the bridge scenario are projected. In step 370, the client is allowed to select a withdrawal percentage from the fund balance that the client believes is safe, and withdrawals from the fund balance are projected using an inflation assumption. Then, in step 375, fund balances are projected and compared to the bridge scenario. In step 380, a determination is made as to whether additional bridge scenarios should be modeled. If a positive determination is made, step 355 is repeated, so that alternate funding sources can be projected for such scenarios. Output of process 350 can be analyzed in a Monte Carlo simulation, or other suitable statistical analysis could be applied.

Figure 9:
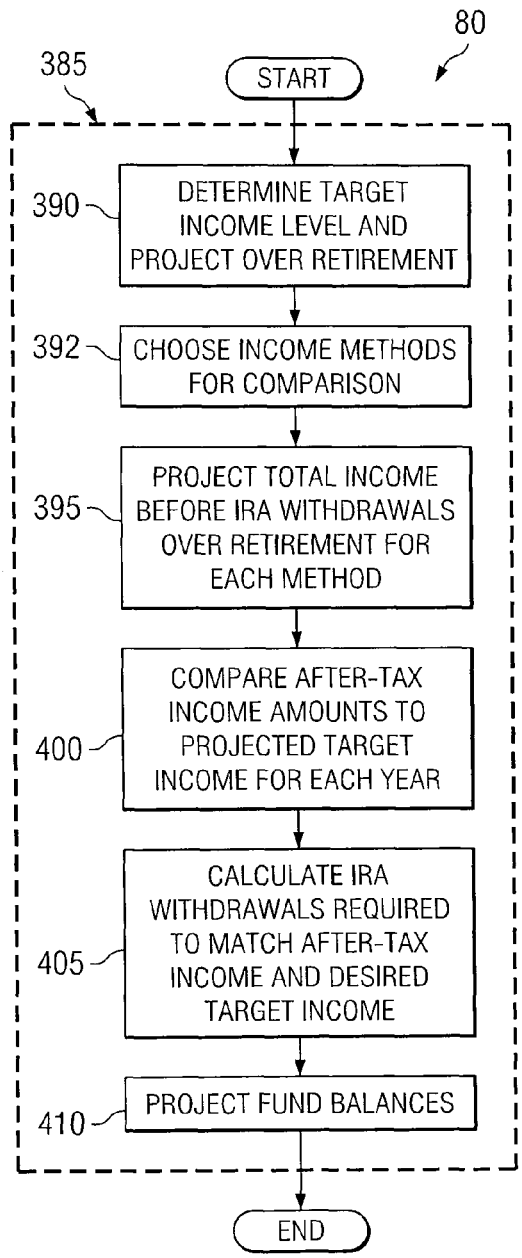
FIGS. 9 and 10 are flowcharts showing the alternate funding comparison step of FIG. 1 in greater detail.
Figure 10:
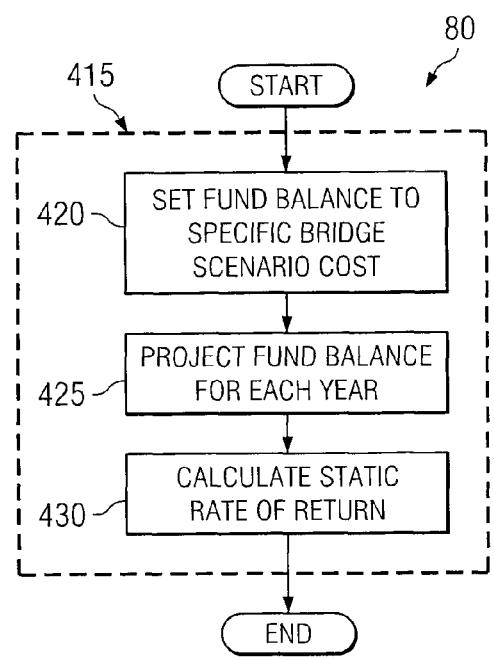

FIGS. 9 and 10 are flowcharts showing the alternate funding comparison step of FIG. 1 in greater detail. FIG. 9 is a flowchart showing process 385, which allows for comparisons of various income methods in the context of a retirement plan and as defined by the ability to meet a targeted income level each year. Target income levels can be accounted for in process 385 and rates of return to be calculated in process 415 shown in FIG. 10. In process 385, beginning in step 390, a target income level is determined (e.g., specified by the client), and income is projected over the client's retirement. In step 392, at least one income method is selected for comparison purposes, including any applicable bridge scenarios and alternative funding methods. Then, in step 395, total income before IRA withdrawals is calculated over the client's retirement for each method. In step 400, after-tax income amounts under each model are compared to the projected target income for each year of the client's retirement. In step 405, IRA withdrawals required to mach after-tax income and desired target income are calculated for each model. In step 410, fund balances are projected for each model, FIG. 10 is a flowchart showing an additional method, indicated generally as process 415, for comparing funding approaches and determining the relative values of different income models. Any models and alternative funding methods, including those disclosed herein with reference to FIGS. 7-9, can be analyzed by process 415. Beginning in step 420, a fund balance is set for a specific bridge scenario cost. Alternatively, the fund balance can be set equal to all available funds for retirement. Then, in step 425, the fund balance is projected for each year. In step 430, the minimum static rate of return is calculated so that all projected IRA withdrawals under the specified scenario can be made. Optionally, a Monte Carlo simulation can be performed to determine the probability of successfully funding one or more bridge scenarios, or of successfully funding one or more IRA withdrawals.

Figure 11:
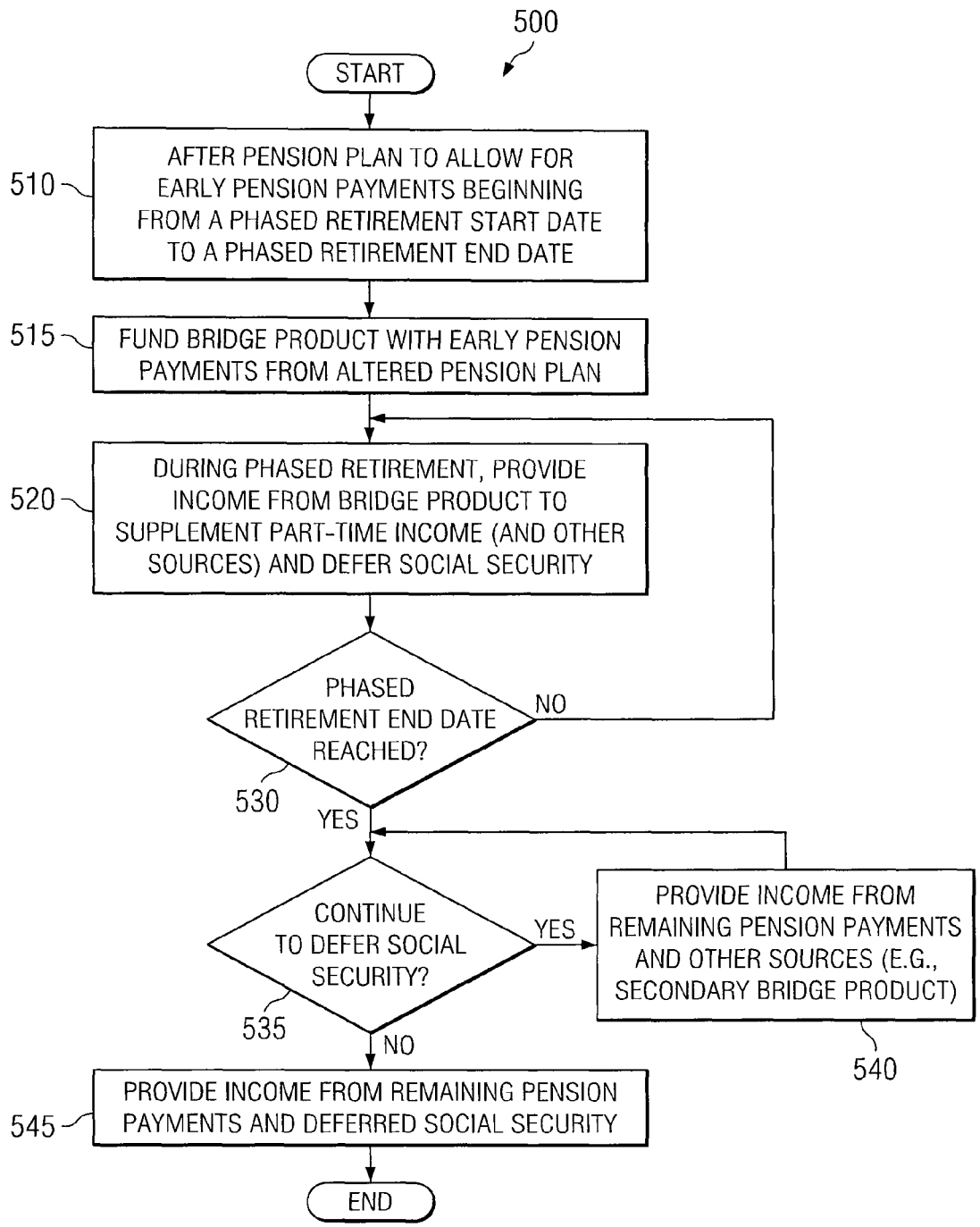
FIG. 11 is a flowchart showing a method according to the present invention for supplementing part-time income in a "phased" retirement period while allowing Social Security benefits to be deferred.

FIG. 11 is a flowchart showing a method, inidicated generally at 500, for supplementing part-time income in a "phased" retirement period while allowing Social Security benefits to be deferred. The method allows an individual to participate in a partial or phased retirement, wherein the individual can receive income from a part-time job after the individual retires from his or her full-time job and income during the phased retirement period is supplemented using income from a bridge product funded by a pension. The method could be used in connection with any of the aforementioned models discussed herein to allow an individual to supplement retirement income to defer Social Security.

Beginning in step 510, a traditional pension plan is altered (amended) to allow for early pension payments beginning from a phased retirement start date and extending through to a phased retirement end date. For example, if a traditional pension calls for fixed monthly payments in retirement, the pension could be altered to provide for early payments beginning at a phased retirement start date (e.g., when the individual reaches age 62) and extending through to a phased retirement end date (e.g., when the individual reaches age 70). The phased retirement start and end dates could be any desired dates. After the phased retirement end date, remaining pension payments would continue. Thus, the altered or amended pension plan includes forward-shifted payments received during phased retirement and remaining payments are received after phased retirement.

In step 515, a bridge product is funded with the early pension payments from the altered (amended) pension plan. Such funding could occur in the form of pension payments over time or even in an immediate pension payout option, wherein the early pension payments are transferred in a lump sum into the bridge product. Then, in step 520, income is provided from the bridge product during phased retirement to supplement part-time income, and Social Security benefits are deferred. The supplemental income allows the individual to receive sufficient income during phased retirement to meet the individual's needs, while allowing the individual to engage in part-time work. Further, the supplemental income allows the individual to defer Social Security benefits so as to maximize such benefits later in retirement.

In step 530, a determination is made as to whether the individual has reached a phased retirement end date. The phased retirement end date could be pre-defined by the individual (e.g., the individual determines prior to phased retirement that he or she will work part-time until a certain age). If a negative determination is made, step 520 is repeated, and the individual continues to receive part-time income and income from the bridge product. If a positive determination is made and the phased retirement end date is reached, step 535 is carried out, wherein a determination is made as to whether the individual desires to continue to defer Social Security. If a positive determination is made, step 540 is carried out, wherein the individual can receive remaining pension payments and income from other sources, such as a secondary bridge product, a spouse's income, a spouse's Social Security benefits, or any other income source. Then, step 535 is repeated.

If a negative determination is made in step 535 (i.e., the individual wishes to cease deferring Social Security benefits), step 545 is carried out, wherein deferred Social Security benefits are provided to the individual until death, in addition to remaining payments from the pension plan. Accordingly, the method 500 provides income for phased and full retirement, which can be wrapped around existing income sources and allow an individual to maximize Social Security benefits through deferment.

Figure 12A:
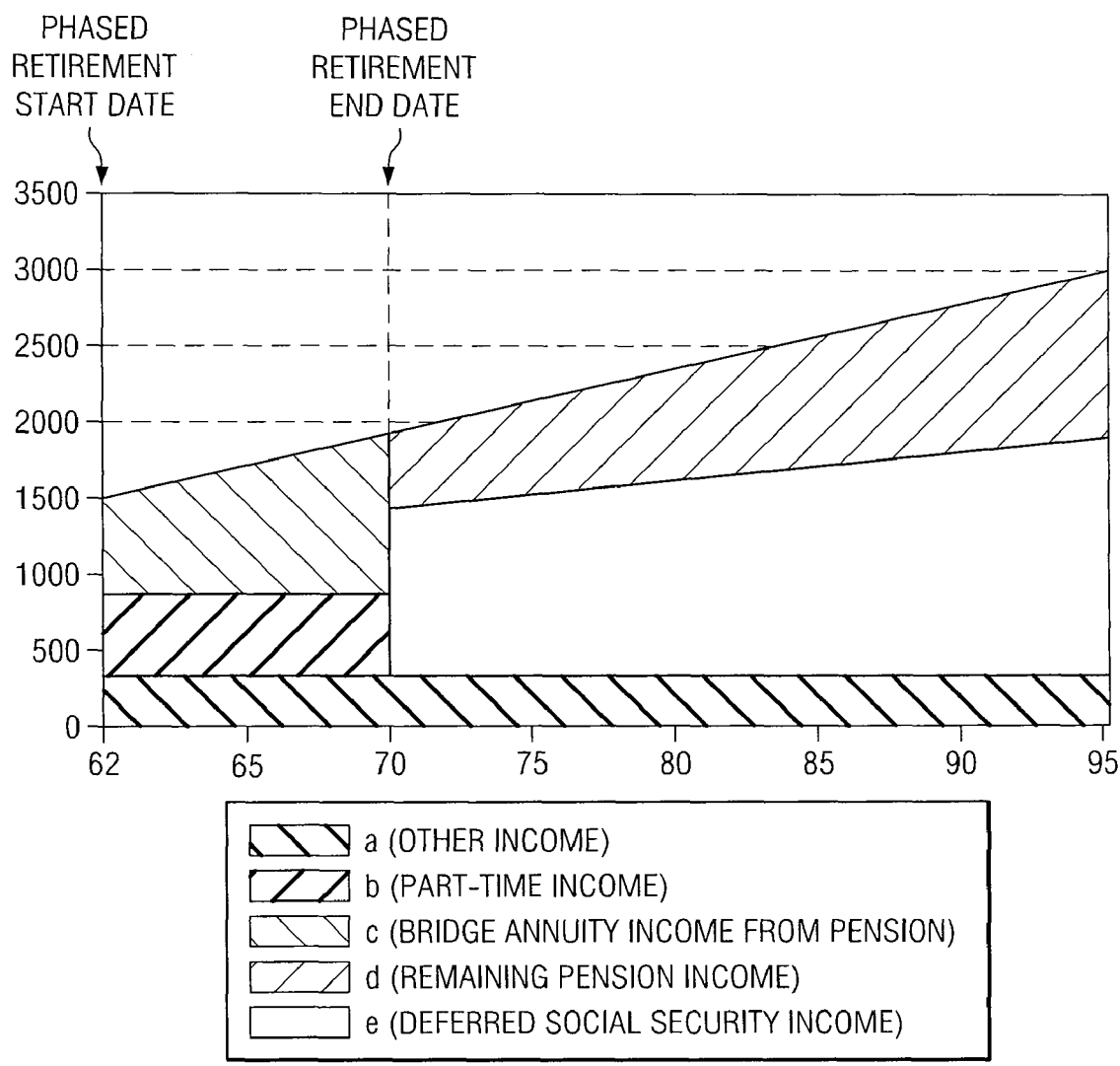
FIGS. 12a-12b are graphs showing projected income using the method shown in FIG. 11.
Figure 12B:
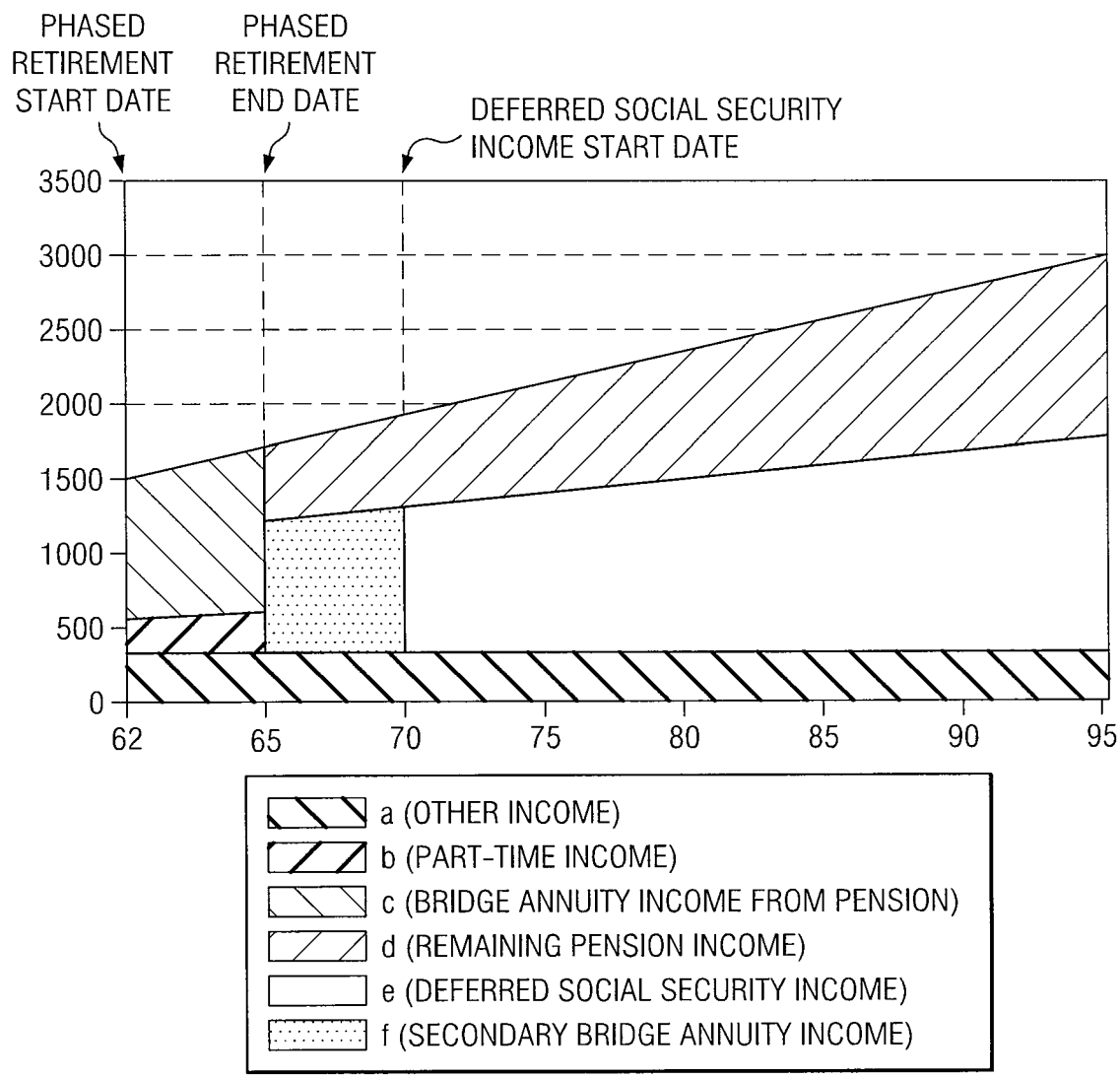

FIGS. 12a-12b are graphs showing projected income using the method shown in FIG. 11. As shown in FIG. 12a, the individual begins phased retirement at age 62 and ceases phased retirement at age 70. These ages are purely illustrative in nature, and could vary as desired. During phased retirement, income is provided from other income sources (area A), part-time income (area B), and income from the bridge annuity funded by the amended (altered) pension plan (area C). At the phased retirement end date, income is provided from other income sources (area A), remaining pension payments (area D), and deferred Social Security income (area E). Thus, income from the bridge product supplements part-time income during phased retirement, while allowing Social Security benefits to be deferred.

As shown in FIG. 12b, if an individual chooses to end phased retirement at an earlier date (e.g., at an age earlier than an optimal age to which Social Security benefits should be deferred), the individual can continue to receive income while deferring Social Security benefits. In this example, the phased retirement start date is age 62, the phased retirement end date is age 65, and the start date for receiving deferred Social Security benefits is age 70. During phased retirement (ages 62-65), income is provided from other income sources (area A), part-time income (area B), and income from the bridge annuity funded by the altered (amended) pension plan (area C).

After full retirement and until the deferred Social Security income date, income is provided from other income sources (area A), remaining pension income (area D), and a secondary bridge annuity income (area F). It is conceivable that the income represented in area F could also be provided from the pension bridge annuity, through a planned step-up in the disbursed amount if sufficient assets exist in the annuity. As such, the pension bridge annuity could be structured to "wrap around" the part-time income to fill the gap left by the cessation of part-time income at full retirement. Alternatively, a second bridge product could be utilized, particularly where one decides to fully retire earlier than planned, while still desiring to defer Social Security benefits. At age 70, income is provided from other income sources (area A), deferred Social Security (area E), and remaining pension income (area D). Thus, as can be readily appreciated, the method of the present invention shown in FIGS. 11 and 12a-12b provides sufficient flexibility to allow an individual to engaged in phased retirement, while simultaneously allowing the individual to defer Social Security benefits to maximize retirement income.

Importantly, the present invention can be used prior to a client's retirement as a planning tool, wherein various income scenarios are modeled in accordance with the invention. Depending upon the results of modeling, the client can purchase a bridge product ahead of retirement, e.g., at age 40, which product is tailored to future retirement income levels modeled by the present invention. For example, a deferred annuity could be purchased pre-retirement at a discounted rate, and invested over a period of time prior to retirement. Additionally, results of modeling could be used to provide a target future retirement income level. The client could then save and/or invest over a period of time pre-retirement in order to reach the target retirement income level, for example, by purchasing one or more investment products as an accumulation vehicle prior to retirement.

Having thus described the invention in detail, it is to be understood that the foregoing description is not intended to limit the spirit and scope thereof. What is desired to be protected by Letters Patent is set forth in the appended claims.

What is claimed is:

1. A financial planning system for maximizing retirement income for an individual who takes phased retirement, comprising:

one or more computer systems; and a financial planning application embodied on a computer readable medium and operable, when executed by the one or more computer systems, to:
receive a target income for a retirement period, the retirement period comprising a first phase having a first start date and a second phase having a second start date after the first start date;
receive a partial retirement age associated with the first phase start date and a deferred social security age associated with the second phase start date;
receive an expected part-time income for the first phase;
determine a deferred social security income for the second phase, based on the deferred social security age; and
based on the expected part-time income and the deferred social security income, generate an income model comprising payments combinable with the expected part-time income sufficient to meet the target income for the first phase, and payments combinable with the deferred social security income sufficient to meet the target income for the second phase.

2. The system of claim 1, wherein the financial planning application is further operable to provide the income model to the individual.

3. The system of claim 1, wherein the financial planning application is further operable to:
identify a third phase having a third phase start date at the first phase end date and a third phase end date at the second phase start date, the third phase start date corresponding to a full retirement age and the third phase end date corresponding to the deferred social security age;
based on the income model, identify a bridge product combinable with the remaining payments sufficient to meet the target income for the third phase; and
determine a bridge product cost associated with the identified bridge product.

4. The system of claim 3, wherein the bridge product comprises one selected from a group consisting of: a bridge annuity, a Funding Agreement Note Insurance Program, a settlement option under a deferred annuity, a mutual fund, a certificate of deposit, a bond, and a retail note.

5. The system of claim 1, wherein the target income comprises one of a fixed periodic income over the entire retirement period and a periodic income with a fixed growth rate.

6. A financial planning system for maximizing retirement income for an individual with a pension plan who takes phased retirement, comprising:

one or more computer systems; and a financial planning application embodied on a computer readable medium and operable, when executed by the one or more computer systems, to:
receive a target income for a retirement period, the retirement period comprising a first phase having a first start date and a second phase having a second start date after the first start date;
receive a partial retirement age associated with the first phase start date and a deferred social security age associated with the second phase start date;
receive an expected part-time income for the first phase;
determine a deferred social security income for the second phase, based on the deferred social security age; and
based on the expected part-time income, the deferred social security income, and the pension plan, generate an amended pension plan comprising early pension payments combinable with the expected part-time income sufficient to meet the target income for the first phase and later pension payments combinable with the deferred social security income sufficient to meet the target income for the second phase.

7. The system of claim 6, wherein the financial planning application is further operable to provide the amended pension plan to the individual.

8. The system of claim 6, wherein the financial planning application is further operable to:
identify a third phase having a third phase start date at the first phase end date and a third phase end date at the second phase start date, the third phase start date corresponding to a full retirement age and the third phase end date corresponding to the deferred social security age;
based on the amended pension plan, identify a bridge product combinable with the remaining pension payments sufficient to meet the target income for the third phase; and
determine a bridge product cost associated with the identified bridge product.

9. The system of claim 8, wherein the bridge product comprises one selected from a group consisting of: bridge annuity, a Funding Agreement Note Insurance Program, a settlement option under a deferred annuity, a mutual fund, a certificate of deposit, a bond, and a retail note.

10. The system of claim 6, wherein the target income comprises one of a fixed periodic income over the entire retirement period and a periodic income with a fixed growth rate.

* * * * *